US010517031B2

(12) United States Patent
Takahashi et al.

(10) Patent No.: US 10,517,031 B2
(45) Date of Patent: Dec. 24, 2019

(54) USER APPARATUS, BASE STATION, CELL SELECTION CONTROL METHOD, AND PARAMETER TRANSMISSION METHOD

(71) Applicant: NTT DOCOMO, INC., Tokyo (JP)

(72) Inventors: Hideaki Takahashi, Tokyo (JP); Hiroshi Chin, Tokyo (JP); Kengo Yagyu, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/309,379

(22) PCT Filed: May 1, 2015

(86) PCT No.: PCT/JP2015/063123
§ 371 (c)(1),
(2) Date: Nov. 7, 2016

(87) PCT Pub. No.: WO2015/170689
PCT Pub. Date: Nov. 12, 2015

(65) Prior Publication Data
US 2017/0078939 A1    Mar. 16, 2017

(30) Foreign Application Priority Data
May 9, 2014    (JP) .................... 2014-098135

(51) Int. Cl.
*H04W 36/24*    (2009.01)
*H04L 27/26*    (2006.01)
*H04W 36/30*    (2009.01)

(52) U.S. Cl.
CPC ........ *H04W 36/24* (2013.01); *H04L 27/2602* (2013.01); *H04W 36/30* (2013.01)

(58) Field of Classification Search
CPC . H04W 36/24; H04W 36/0094; H04W 36/30; H04W 48/20; H04W 48/16; H04W 24/10; H04L 27/2602
See application file for complete search history.

(56) References Cited

U.S. PATENT DOCUMENTS

2012/0178465 A1*  7/2012  Lin ................. H04W 24/10
                                                    455/450
2012/0195226 A1*  8/2012  Liu ................. H04L 1/0026
                                                    370/252

(Continued)

FOREIGN PATENT DOCUMENTS

JP    2014-506421 A    3/2014
JP      5453554 B1     3/2014

OTHER PUBLICATIONS

J. Sangiamwong, Y. Saito, N. Miki, T. Abe, S. Nagata and Y. Okumura, "Investigation on Cell Selection Methods Associated with Inter-cell Interference Coordination in Heterogeneous Networks for LTE-Advanced Downlink," 17th European Wireless 2011—Sustainable Wireless Technologies, Vienna, Austria, 2011, pp. 1-6.*

(Continued)

*Primary Examiner* — Jamaal Henson
(74) *Attorney, Agent, or Firm* — Osha Liang LLP

(57) ABSTRACT

A user apparatus in a mobile communication system including a base station and the user apparatus, including: reception means that receives, from the base station, a parameter for all symbols that is used when performing cell selection processing or cell reselection processing based on all symbol signal reception quality that is signal reception quality based on measurement in all OFDM symbols; and cell selection control means that performs measurement of the all symbol signal reception quality, and performs cell selection process- (Continued)

ing or cell reselection processing by using a result of the measurement and the parameter for all symbols received by the reception means.

8 Claims, 33 Drawing Sheets

(56) References Cited

U.S. PATENT DOCUMENTS

| | | | | |
|---|---|---|---|---|
| 2013/0028109 A1* | 1/2013 | Jongren | ............... | H04W 16/32 370/252 |
| 2013/0114435 A1* | 5/2013 | Wang | .................. | H04W 48/16 370/252 |
| 2013/0176877 A1* | 7/2013 | Sadek | .................. | H04W 24/02 370/252 |
| 2013/0195070 A1* | 8/2013 | Bashar | .................... | H04W 4/70 370/330 |
| 2013/0201853 A1* | 8/2013 | Perets | .................. | H04W 48/16 370/252 |
| 2014/0086114 A1* | 3/2014 | Ng | ....................... | H04L 1/0026 370/280 |
| 2014/0126403 A1* | 5/2014 | Siomina | ............... | H04W 24/10 370/252 |
| 2014/0128115 A1* | 5/2014 | Siomina | ............... | H04L 1/0015 455/501 |
| 2014/0200001 A1* | 7/2014 | Song | ................ | H04W 36/0094 455/436 |
| 2014/0293878 A1* | 10/2014 | Shirakabe | ............ | H04W 48/20 370/328 |
| 2014/0334320 A1* | 11/2014 | Liu | ..................... | H04W 52/242 370/252 |
| 2015/0063137 A1* | 3/2015 | Shen | ..................... | H04W 24/10 370/252 |
| 2015/0139353 A1* | 5/2015 | Baek | .................... | H04L 5/0007 375/295 |
| 2015/0312789 A1* | 10/2015 | You | ...................... | H04L 1/0693 370/252 |
| 2016/0036541 A1* | 2/2016 | Siomina | ............... | H04W 24/10 455/422.1 |

OTHER PUBLICATIONS

3GPP TS 36.304 V12.0.0 (Mar. 2014), titled "3rd Generation Partnership Project; Technical Specification Group Radio Access Network; Evolved Universal Terrestrial Radio Access (E-UTRA); User Equipment (UE) procedures in idle mode (Release 12)", (TS 36.304 hereinafter) was published Mar. 2014, pp. 01-34.*
R4-142526, titled "LS on defining the new RSRQ measurements definition", (R4-142526 hereinafter) was published Mar. 31-Apr. 4, 2014, pp. 01-02, during 3GPP TSG RAN WG4 Meeting #70bis Meeting in San Jose del Cabo, Mexico.*
M. Shirakabe, A. Morimoto and N. Miki, "Performance evaluation of inter-cell interference coordination and cell range expansion in heterogeneous networks for LTE-Advanced downlink," 2011 8th International Symposium on Wireless Communication Systems, Aachen, 2011, pp. 844-848; doi: 10.1109/ISWCS.2011.6125281.*
3GPP TS 36.304 V12.0.0 (Mar. 2014), titled "3rd Generation Partnership Project; Technical Specification Group Radio Access Network; Evolved Universal Terrestrial Radio Access (E-UTRA); User Equipment (UE) procedures in idle mode (Release 12)", was published Mar. 2014, pp. 01-34. (Year: 2014).*
3GPP TS 36.133 V10.14.0 (Mar. 2014), titled "3rd Generation Partnership Project; Technical Specification Group Radio Access Network; Evolved Universal Terrestrial Radio Access (E-UTRA); Requirements for support of radio resource management (Release 12)", was published Mar. 2014, pp. 01-138.*
R4-142526, titled "LS on defining the new RSRQ measurements definition", (R4-142526 hereinafter) was published Mar. 31-Apr. 4, 2014, pp. 01-02, during 3GPP TSG RAN WG4 Meeting #70bis Meeting in San Jose del Cabo, Mexico. (Year: 2014).*
Extended European Search Report issued in the counterpart European Patent Application No. 15789569.9, dated Aug. 18, 2017 (14 pages).
NTT Docomo, Inc.; "Idle mode support on new RSRQ measurement definition"; 3GPP TSG-RAN WG2 #87, R2-143075; Dresden, Germany, Aug. 18-22, 2014 (2 pages).
Qualcomm Incorporated; "Wideband RRM Measurements"; 3GPP TSG-RAN WG4 #64, R4-124165; Qingdao, China, Aug. 13-17, 2012 (5 pages).
Ericsson, et al.; "Introduction of wideband RSRQ measurements in Idle mode"; 3GPP TSG-RAN WG2 #81, R2-130883; St. Julian's, Malta, Jan. 28-Feb. 1, 2013 (19 pages).
International Search Report issued in PCT/JP2015/063123, dated Jun. 16, 2015 (2 pages).
Written Opinion of the International Searching Authority issued in PCT/JP2015/063123, dated Jun. 16, 2015 (4 pages).
3GPP TS 36.304 V12.0.0; "3rd Generation Partnership Project; Technical Specification Group Radio Access Network; Evolved Universal Terrestrial Radio Access (E-UTRA); User Equipment (UE) procedures in idle mode (Release 12)"; Mar. 2014 (34 pages).
TSG RAN WG; "LS on defining the new RDRQ measurements definition"; 3GPP TSG RAN WG4 Meeting #70bis, R4-142526; San Jose del Cabo, Mexico; Mar. 31-Apr. 4, 2014 (2 pages).
3GPP TS 36.331 V12.1.0; "3rd Generation Partnership Project; Technical Specification Group Radio Access Network; Evolved Universal Terrestrial Radio Access (E-UTRA); Radio Resource Control (RRC); Protocol specification (Release 12)"; Mar. 2014 (356 pages).
3GPP TS 36.214 V11.1.0; "3rd Generation Partnership Project; Technical Specification Group Radio Access Network; Evolved Universal Terrestrial Radio Access (E-UTRA); Physical layer; Measurements (Release 11)"; Dec. 2012 (14 pages).
3GPP TS 36.331 V12.4.1; "3rd Generation Partnership Project; Technical Specification Group Radio Access Network; Evolved Universal Terrestrial Radio Access (E-UTRA); Radio Resource Control (RRC); Protocol specification (Release 12)"; Dec. 2014 (410 pages).
3GPP TS 36.306 V12.3.0; "3rd Generation Partnership Project; Technical Specification Group Radio Access Network; Evolved Universal Terrestrial Radio Access (E-UTRA); User Equipment (UE) radio access capabilities (Release 12)"; Dec. 2014 (36 pages).
3GPP TS 25.331 V12.4.0; "3rd Generation Partnership Project; Technical Specification Group Radio Access Network; Radio Resource Control (RRC); Protocol specification (Release 12)"; Dec. 2014 (2223 pages).
3GPP TS 25.306 V12.4.0; "3rd Generation Partnership Project; Technical Specification Group Radio Access Network; UE Radio Access capabilities (Release 12)"; Dec. 2014 (75 pages).
Office Action issued in corresponding Chinese Application No. 201580023955.1 dated Apr. 2, 2019 (16 pages).

* cited by examiner

FIG.5

```
-- ASN1START

SystemInformationBlockType1 ::=         SEQUENCE {
    cellAccessRelatedInfo                   SEQUENCE {
        plmn-IdentityList                       PLMN-IdentityList,
        trackingAreaCode                        TrackingAreaCode,
        cellIdentity                            CellIdentity,
        cellBarred                              ENUMERATED {barred, notBarred},
        intraFreqReselection                    ENUMERATED {allowed, notAllowed},
        csg-Indication                          BOOLEAN,
        csg-Identity                            CSG-Identity            OPTIONAL    -- Need OR
    },
    nonCriticalExtension                    SystemInformationBlockType1-v1130-IEs    OPTIONAL
}

SystemInformationBlockType1-v1130-IEs ::=   SEQUENCE {
    tdd-Config-v1130                        TDD-Config-v1130            OPTIONAL,   -- Cond TDD-OR
    cellSelectionInfo-v1130                 CellSelectionInfo-v1130     OPTIONAL,   -- Cond WB-RSRQ
    nonCriticalExtension                    SystemInformationBlockType1-v12xy-IEs                OPTIONAL
}

SystemInformationBlockType1-v12xy-IEs ::=   SEQUENCE {
    cellSelectionInfo-v12xy                 CellSelectionInfo-v12xy     OPTIONAL,   -- Cond RSRQ1
    nonCriticalExtension                    SEQUENCE {}                 OPTIONAL
}

PLMN-IdentityList ::=                       SEQUENCE (SIZE (1..maxPLMN-r11)) OF PLMN-IdentityInfo PLMN-IdentityInfo ::=                       SEQUENCE {
    plmn-Identity                               PLMN-Identity,
    cellReservedForOperatorUse                  ENUMERATED {reserved, notReserved}
}

SchedulingInfoList ::= SEQUENCE (SIZE (1..maxSI-Message)) OF SchedulingInfo

SchedulingInfo ::= SEQUENCE {
    si-Periodicity                              ENUMERATED {
                                                    rf8, rf16, rf32, rf64, rf128, rf256, rf512},
    sib-MappingInfo                             SIB-MappingInfo
}

SIB-MappingInfo ::= SEQUENCE (SIZE (0..maxSIB-1)) OF SIB-Type

SIB-Type ::=                                ENUMERATED {
                                                sibType3, sibType4, sibType5, sibType6,
                                                sibType7, sibType8, sibType9, sibType10,
                                                sibType11, sibType12-v920, sibType13-v920,
                                                sibType14-v1130, sibType15-v1130,
                                                sibType16-v1130, spare2, spare1, ...}

CellSelectionInfo-v920 ::=                  SEQUENCE {
    q-QualMin-r9                                Q-QualMin-r9,
    q-QualMinOffset-r9                          INTEGER (1..8)          OPTIONAL    -- Need OP
}

CellSelectionInfo-v1130 ::=                 SEQUENCE {
    q-QualMinWB-r11                             Q-QualMin-r9
}

CellSelectionInfo-v12xy ::=                 SEQUENCE {
    q-QualMinRev-r12                            Q-QualMin-r9
}

-- ASN1STOP
```

FIG.6A

| SystemInformationBlockType1 field descriptions |
|---|
| *cellBarred*<br>barred means the cell is barred, as defined in TS 36.304 [4]. |
| *cellReservedForOperatorUse*<br>As defined in TS 36.304 [4]. |
| *csg-Identity*<br>Identity of the Closed Subscriber Group the cell belongs to. |
| *csg-Indication*<br>If set to TRUE the UE is only allowed to access the cell if it is a CSG member cell, if selected during manual CSG selection or to obtain limited service, see TS 36.304 [4]. |

| |
|---|
| *plmn-IdentityList*<br>List of PLMN identities. The first listed *PLMN-Identity* is the primary PLMN. |
| *p-Max*<br>Value applicable for the cell. If absent the UE applies the maximum power according to the UE capability. |
| *q-QualMin*<br>Parameter "$Q_{qualmin}$" in TS 36.304 [4]. If *cellSelectionInfo-v920* is not present, the UE applies the (default) value of negative infinity for $Q_{qualmin}$. |
| *q-QualMinOffset*<br>Parameter "$Q_{qualminoffset}$" in TS 36.304 [4]. Actual value $Q_{qualminoffset}$ = IE value [dB]. If *cellSelectionInfo-v920* is not present or the field is not present, the UE applies the (default) value of 0 dB for $Q_{qualminoffset}$. Affects the minimum required quality level in the cell. |
| *q-QualMinRev*<br>If this field is present, the UE shall, when performing RSRQ measurements, measure RSSI over all OFDM symbols in accordance with TS 36.214 [16] and apply the value of this field for the parameter "$Q_{qualmin}$" in TS 36.304 [4]. Otherwise, the UE applies the value of *q-Qualmin* instead. |
| *q-QualMinWB*<br>If this field is present, the UE shall, when performing RSRQ measurements, use a wider bandwidth in accordance with TS 36.133 [16] and apply the value of this field for the parameter "$Q_{qualmin}$" in TS 36.304 [4]. Otherwise, the UE applies the value of *q-Qualmin* instead. |
| *q-RxLevMinOffset*<br>Parameter $Q_{rxlevminoffset}$ in TS 36.304 [4]. Actual value $Q_{rxlevminoffset}$ = IE value * 2 [dB]. If absent, the UE applies the (default) value of 0 dB for $Q_{rxlevminoffset}$. Affects the minimum required Rx level in the cell. |
| *sib-MappingInfo*<br>List of the SIBs mapped to this *SystemInformation* message. There is no mapping information of SIB2; it is always present in the first *SystemInformation* message listed in the *schedulingInfoList* list. |
| *si-Periodicity*<br>Periodicity of the SI-message in radio frames, such that rf8 denotes 8 radio frames, rf16 denotes 16 radio frames, and so on. |
| *si-WindowLength*<br>Common SI scheduling window for all SIs. Unit in milliseconds, where ms1 denotes 1 millisecond, ms2 denotes 2 milliseconds and so on. |
| *systemInfoValueTag*<br>Common for all SIBs other than MIB, SIB1, SIB10, SIB11, SIB12 and SIB14. Change of MIB and SIB1 is detected by acquisition of the corresponding message. |
| *trackingAreaCode*<br>A *trackingAreaCode* that is common for all the PLMNs listed. |

FIG.6B

| Conditional presence | Explanation |
|---|---|
| FBI-max | The field is mandatory present if *freqBandIndicator* (i.e. without suffix) is set to *maxFBI*. Otherwise the field is not present. |
| mFBI-max | The field is mandatory present if one or more entries in *multiBandInfoList* (i.e. without suffix, introduced in -v8h0) is set to *maxFBI*. Otherwise the field is not present. |
| RSRQ | The field is mandatory present if SIB3 is being broadcast and *threshServingLowQ* is present in SIB3; otherwise optionally present, Need OP. |
| RSRQ1 | The field is optionally present, need OP if *cellSelectionInfo-v920* is present; otherwise it it not present. |
| TDD | This field is mandatory present for TDD; it is not present for FDD and the UE shall delete any existing value for this field. |
| TDD-OR | The field is optional present for TDD, need OR; it is not present for FDD. |
| WB-RSRQ | The field is optionally present, need OP if the measurement bandwidth indicated by *allowedMeasBandwidth* in *systemInformationBlockType3* is 50 resource blocks or larger; otherwise it is not present. |

FIG.7

```
-- ASN1START

SystemInformationBlockType3 ::=          SEQUENCE {
        cellReselectionInfoCommon              SEQUENCE {
                q-Hyst                                ENUMERATED {
                                                              dB0, dB1, dB2, dB3, dB4, dB5, dB6, dB8, dB10,
                                                              dB12, dB14, dB16, dB18, dB20, dB22, dB24},
                speedStateReselectionPars             SEQUENCE {
                        mobilityStateParameters               MobilityStateParameters,
                        q-HystSF                      SEQUENCE {
                                sf-Medium                     ENUMERATED {
                                                                      dB-6, dB-4, dB-2, dB0},
                                sf-High                       ENUMERATED {
                                                                      dB-6, dB-4, dB-2, dB0}
                        }
                }                                                             OPTIONAL       -- Need OP
        },
        cellReselectionServingFreqInfo         SEQUENCE {
                s-NonIntraSearch                      ReselectionThreshold    OPTIONAL,      -- Need OP
                threshServingLow                      ReselectionThreshold,
                cellReselectionPriority               CellReselectionPriority
        },
        intraFreqCellReselectionInfo           SEQUENCE {
                q-RxLevMin                            Q-RxLevMin,
                p-Max                                 P-Max                   OPTIONAL,      -- Need OP
                s-IntraSearch                         ReselectionThreshold    OPTIONAL,      -- Need OP
                allowedMeasBandwidth                  AllowedMeasBandwidth    OPTIONAL,      -- Need OP
                presenceAntennaPort1                  PresenceAntennaPort1,
                neighCellConfig                       NeighCellConfig,
                t-ReselectionEUTRA                    T-Reselection,
                t-ReselectionEUTRA-SF                 SpeedStateScaleFactors  OPTIONAL       -- Need OP
        },
        ...,
        lateNonCriticalExtension               OCTET STRING                   OPTIONAL,
        [[      s-IntraSearch-v920             SEQUENCE {
                        s-IntraSearchP-r9             ReselectionThreshold,
                        s-IntraSearchQ-r9             ReselectionThresholdQ-r9
                }                                                             OPTIONAL,      -- Need OP
                s-NonIntraSearch-v920          SEQUENCE {
                        s-NonIntraSearchP-r9          ReselectionThreshold,
                        s-NonIntraSearchQ-r9          ReselectionThresholdQ-r9
                }                                                             OPTIONAL,      -- Need OP
                q-QualMin-r9                          Q-QualMin-r9            OPTIONAL,      -- Need OP
                threshServingLowQ-r9                  ReselectionThresholdQ-r9 OPTIONAL      -- Need OP
        ]],
        [[      q-QualMinWB-r11                       Q-QualMin-r9            OPTIONAL       -- Cond WB-RSRQ
        ]],
        [[      q-QualMinRev-r12                      Q-QualMin-r9            OPTIONAL       -- Cond RSRQ1
        ]]
}

-- ASN1STOP
```

FIG.8A

| SystemInformationBlockType3 field descriptions |
|---|
| allowedMeasBandwidth<br>If absent, the value corresponding to the downlink bandwidth indicated by the *dl-Bandwidth* included in *MasterInformationBlock* applies. |
| cellReselectionInfoCommon<br>Cell re-selection information common for cells. |
| cellReselectionServingFreqInfo<br>Information common for Cell re-selection to inter-frequency and inter-RAT cells. |
| intraFreqcellReselectionInfo<br>Cell re-selection information common for intra-frequency cells. |
| p-Max<br>Value applicable for the intra-frequency neighbouring E-UTRA cells. If absent the UE applies the maximum power according to the UE capability. |

| |
|---|
| q-QualMin<br>Parameter "$Q_{qualmin}$" in TS 36.304 [4], applicable for intra-frequency neighrbour cells. If the field is not present, the UE applies the (default) value of negative infinity for $Q_{qualmin}$. |
| q-QualMinRev<br>If this field is present, the UE shall, when performing RSRQ measurements, measure RSSI over all OFDM symbols in accordance with TS 36.214 [16] and apply the value of this field for the parameter "$Q_{qualmin}$" in TS 36.304 [4]. Otherwise, the UE applies the value of *q-Qualmin* instead. |
| q-QualMinWB<br>If this field is present, the UE shall, when performing RSRQ measurements, use a wider bandwidth in accordance with TS 36.133 [16] and apply the value of this field for the parameter "$Q_{qualmin}$" in TS 36.304 [4]. Otherwise, the UE applies the value of *q-Qualmin* instead. |
| q-RxLevMin<br>Parameter "$Q_{rxlevmin}$" in TS 36.304 [4], applicable for intra-frequency neighbour cells. |
| s-IntraSearch<br>Parameter "$S_{IntraSearchP}$" in TS 36.304 [4]. If the field *s-IntraSearchP* is present, the UE applies the value of *s-IntraSearchP* instead. Otherwise if neither *s-IntraSearch* nor *s-IntraSearchP* is present, the UE applies the (default) value of infinity for $S_{IntraSearchP}$. |
| s-IntraSearchP<br>Parameter "$S_{IntraSearchP}$" in TS 36.304 [4]. See descriptions under *s-IntraSearch*. |
| s-IntraSearchQ<br>Parameter "$S_{IntraSearchQ}$" in TS 36.304 [4]. If the field is not present, the UE applies the (default) value of 0 dB for $S_{IntraSearchQ}$. |
| s-NonIntraSearch<br>Parameter "$S_{nonIntraSearchP}$" in TS 36.304 [4]. If the field *s-NonIntraSearchP* is present, the UE applies the value of *s-NonIntraSearchP* instead. Otherwise if neither *s-NonIntraSearch* nor *s-NonIntraSearchP* is present, the UE applies the (default) value of infinity for $S_{nonIntraSearchP}$. |
| s-NonIntraSearchP<br>Parameter "$S_{nonIntraSearchP}$" in TS 36.304 [4]. See descriptions under *s-NonIntraSearch*. |
| s-NonIntraSearchQ<br>Parameter "$S_{nonIntraSearchQ}$" in TS 36.304 [4]. If the field is not present, the UE applies the (default) value of 0 dB for $S_{nonIntraSearchQ}$. |
| speedStateReselectionPars<br>Speed dependent reselection parameters, see TS 36.304 [4]. If this field is absent, i.e, *mobilityStateParameters* is also not present, UE behaviour is specified in TS 36.304 [4]. |
| threshServingLow<br>Parameter "$Thresh_{Serving, LowP}$" in TS 36.304 [4]. |
| threshServingLowQ<br>Parameter "$Thresh_{Serving, LowQ}$" in TS 36.304 [4]. |
| t-ReselectionEUTRA<br>Parameter "$Treselection_{EUTRA}$" in TS 36.304 [4]. |
| t-ReselectionEUTRA-SF<br>Parameter "Speed dependent ScalingFactor for $Treselection_{EUTRA}$" in TS 36.304 [4]. If the field is not present, the UE behaviour is specified in TS 36.304 [4]. |

FIG.8B

| Conditional presence | Explanation |
|---|---|
| RSRQ1 | The field is optionally present, need OP if *q-QualMin-r9* is present; otherwise it it not present. |
| WB-RSRQ | The field is optionally present, need OP if the measurement bandwidth indicated by *allowedMeasBandwidth* is 50 resource blocks or larger; otherwise it is not present. |

FIG.9

```
-- ASN1START

SystemInformationBlockType5 ::=    SEQUENCE {
    interFreqCarrierFreqList            InterFreqCarrierFreqList,
    ...,
    lateNonCriticalExtension            OCTET STRING (CONTAINING SystemInformationBlockType5-v8h0-IEs)    OPTIONAL
}

SystemInformationBlockType5-v8h0-IEs ::=    SEQUENCE {
    interFreqCarrierFreqList-v8h0  SEQUENCE (SIZE (1..maxFreq)) OF InterFreqCarrierFreqInfo-v8h0    OPTIONAL,  -- Need OP
    nonCriticalExtension           SystemInformationBlockType5-v9e0-IEs    OPTIONAL
}

SystemInformationBlockType5-v9e0-IEs ::=    SEQUENCE {
    interFreqCarrierFreqList-v9e0  SEQUENCE (SIZE (1..maxFreq)) OF InterFreqCarrierFreqInfo-v9e0    OPTIONAL,  -- Need OR
    nonCriticalExtension           SystemInformationBlockType5-v12xy-IEs    OPTIONAL
}

SystemInformationBlockType5-v12xy-IEs ::=    SEQUENCE {
    interFreqCarrierFreqList-v12xy SEQUENCE (SIZE (1..maxFreq)) OF InterFreqCarrierFreqInfo-v9e0    OPTIONAL,  -- Need OR
    nonCriticalExtension           SEQUENCE {}    OPTIONAL
}

InterFreqCarrierFreqList ::=    SEQUENCE (SIZE (1..maxFreq)) OF InterFreqCarrierFreqInfo InterFreqCarrierFreqInfo ::= SEQUENCE {
    dl-CarrierFreq          ARFCN-ValueEUTRA,
    q-RxLevMin              Q-RxLevMin,
    p-Max                   P-Max              OPTIONAL,    -- Need OP
    t-ReselectionEUTRA      T-Reselection
    ...
            q-QualMin-r9                    Q-QualMin-r9
            threshX-Q-r9                    SEQUENCE {
                threshX-HighQ-r9                ReselectionThresholdQ-r9,
                threshX-LowQ-r9                 ReselectionThresholdQ-r9
            }                                                              OPTIONAL         -- Cond RSRQ
    ]],
    [[  q-QualMinWB-r11                Q-QualMin-r9                       OPTIONAL    -- Cond WB-RSRQ
    ]]
}

InterFreqCarrierFreqInfo-v8h0 ::=       SEQUENCE {
    multiBandInfoList                   MultiBandInfoList                  OPTIONAL    -- Need OR
}

InterFreqCarrierFreqInfo-v9e0 ::=   SEQUENCE {
    dl-CarrierFreq-v9e0                 ARFCN-ValueEUTRA-v9e0  OPTIONAL,  -- Cond dl-FreqMax
    multiBandInfoList-v9e0              MultiBandInfoList-v9e0    OPTIONAL    -- Need OR
}

InterFreqCarrierFreqInfo-v12xy ::=  SEQUENCE {
    q-QualMinRev-r12                    Q-QualMin-r9                       OPTIONAL    -- Cond RSRQ1
}

InterFreqNeighCellList ::=           SEQUENCE (SIZE (1..maxCellInter)) OF InterFreqNeighCellInfo InterFreqNeighCellInfo ::=           SEQUENCE {
    physCellId                          PhysCellId,
    q-OffsetCell                        Q-OffsetRange
}

InterFreqBlackCellList ::=           SEQUENCE (SIZE (1..maxCellBlack)) OF PhysCellIdRange

-- ASN1STOP
```

FIG.10A

| SystemInformationBlockType5 field descriptions |
|---|
| *interFreqBlackCellList* <br> List of blacklisted inter-frequency neighbouring cells. |
| *interFreqCarrierFreqList* <br> List of neighbouring inter-frequencies. E-UTRAN does not configure more than one entry for the same physical frequency regardless of the E-ARFCN used to indicate this. If E-UTRAN includes *interFreqCarrierFreqList-v8h0* and/ or *interFreqCarrierFreqList-v9e0* it includes the same number of entries, and listed in the same order, as in *interFreqCarrierFreqList* (i.e. without suffix). |
| *interFreqNeighCellList* <br> List of inter-frequency neighbouring cells with specific cell re-selection parameters. |
| *multiBandInfoList* <br> Indicates the list of frequency bands in addition to the band represented by *dl-CarrierFreq* for which cell reselection parameters are common. E-UTRAN indicates at most *maxMultiBands* frequency bands (i.e. the total number of entries across both *multiBandInfoList* and *multiBandInfoList-v9e0* is below this limit). |
| *p-Max* <br> Value applicable for the neighbouring E-UTRA cells on this carrier frequency. If absent the UE applies the maximum power according to the UE capability. |
| *q-OffsetCell* <br> Parameter "$Qoffset_{s,n}$" in TS 36.304 [4]. |
| *q-OffsetFreq* <br> Parameter "$Qoffset_{frequency}$" in TS 36.304 [4]. |
| *q-QualMin* <br> Parameter "$Q_{qualmin}$" in TS 36.304 [4]. If the field is not present, the UE applies the (default) value of negative infinity for $Q_{qualmin}$. |
| *q-QualMinRev* <br> If this field is present, the UE shall, when performing RSRQ measurements, measure RSSI over all OFDM symbols in accordance with TS 36.214 [16] and apply the value of this field for the parameter "$Q_{qualmin}$" in TS 36.304 [4]. Otherwise, the UE applies the value of *q-Qualmin* instead. |
| *q-QualMinWB* <br> If this field is present, the UE shall, when performing RSRQ measurements, use a wider bandwidth in accordance with TS 36.133 [16] and apply the value of this field for the parameter "$Q_{qualmin}$" in TS 36.304 [4]. Otherwise, the UE applies the value of *q-Qualmin* instead. |
| *threshX-High* <br> Parameter "$Thresh_{X, HighP}$" in TS 36.304 [4]. |
| *threshX-HighQ* <br> Parameter "$Thresh_{X, HighQ}$" in TS 36.304 [4]. |
| *threshX-Low* <br> Parameter "$Thresh_{X, LowP}$" in TS 36.304 [4]. |
| *threshX-LowQ* <br> Parameter "$Thresh_{X, LowQ}$" in TS 36.304 [4]. |
| *t-ReselectionEUTRA* <br> Parameter "$Treselection_{EUTRA}$" in TS 36.304 [4]. |
| *t-ReselectionEUTRA-SF* <br> Parameter "Speed dependent ScalingFactor for $Treselection_{EUTRA}$" in TS 36.304 [4]. If the field is not present, the UE behaviour is specified in TS 36.304 [4]. |

FIG.10B

| Conditional presence | Explanation |
|---|---|
| dl-FreqMax | The field is mandatory present if, for the corresponding entry in *InterFreqCarrierFreqList* (i.e. without suffix), *dl-CarrierFreq* (i.e. without suffix) is set to *maxEARFCN*. Otherwise the field is not present. |
| RSRQ | The field is mandatory present if *threshServingLowQ* is present in *systemInformationBlockType3*; otherwise it is not present. |
| RSRQ1 | The field is optionally present, need OP if *q-QualMin-r9* is present; otherwise it it not present. |
| WB-RSRQ | The field is optionally present, need OP if the measurement bandwidth indicated by *allowedMeasBandwidth* is 50 resource blocks or larger; otherwise it is not present. |

FIG.12

```
-- ASN1START

SystemInformationBlockType1 ::=      SEQUENCE {
        cellAccessRelatedInfo                SEQUENCE {
                plmn-IdentityList                    PLMN-IdentityList,
                trackingAreaCode                     TrackingAreaCode,
                cellIdentity                         CellIdentity,
                cellBarred                           ENUMERATED {barred, notBarred},
                intraFreqReselection                 ENUMERATED {allowed, notAllowed},
                csg-Indication                       BOOLEAN,
                csg-Identity                         CSG-Identity               OPTIONAL     -- Need OR
        }
```

```
SystemInformationBlockType1-v1130-IEs ::=    SEQUENCE {
        tdd-Config-v1130             TDD-Config-v1130                OPTIONAL,    -- Cond TDD-OR
        cellSelectionInfo-v1130      CellSelectionInfo-v1130         OPTIONAL,    -- Cond WB-RSRQ
        nonCriticalExtension         SystemInformationBlockType1-v12xy-IEs                    OPTIONAL
}

SystemInformationBlockType1-v12xy-IEs ::=    SEQUENCE {
        cellSelectionInfo-v12xy      CellSelectionInfo-v12xy         OPTIONAL,    -- Cond RSRQ1
        nonCriticalExtension         SEQUENCE {}                     OPTIONAL
}

PLMN-IdentityList ::=                SEQUENCE (SIZE (1..maxPLMN-r11)) OF PLMN-IdentityInfo PLMN-IdentityInfo ::=                SEQUENCE {
        plmn-Identity                        PLMN-Identity,
        cellReservedForOperatorUse           ENUMERATED {reserved, notReserved}
}

SchedulingInfoList ::= SEQUENCE (SIZE (1..maxSI-Message)) OF SchedulingInfo

SchedulingInfo ::=      SEQUENCE {
        si-Periodicity                       ENUMERATED {
                                                     rf8, rf16, rf32, rf64, rf128, rf256, rf512},
        sib-MappingInfo                      SIB-MappingInfo
}

SIB-MappingInfo ::= SEQUENCE (SIZE (0..maxSIB-1)) OF SIB-Type

SIB-Type ::=                         ENUMERATED {
                                             sibType3, sibType4, sibType5, sibType6,
                                             sibType7, sibType8, sibType9, sibType10,
                                             sibType11, sibType12-v920, sibType13-v920,
                                             sibType14-v1130, sibType15-v1130,
                                             sibType16-v1130, spare2, spare1, ...}

CellSelectionInfo-v920 ::=           SEQUENCE {
        q-QualMin-r9                         Q-QualMin-r9,
        q-QualMinOffset-r9                   INTEGER (1..8)                  OPTIONAL     -- Need OP
}

CellSelectionInfo-v1130 ::=          SEQUENCE {
        q-QualMinWB-r11                      Q-QualMin-r9
}

CellSelectionInfo-v12xy ::=          SEQUENCE {
        q-QualMinRev-r12                     Q-QualMin-r9,
        q-QualMinComb-r12                    Q-QualMin-r9
}

-- ASN1STOP
```

FIG.13A

| SystemInformationBlockType1 field descriptions |
|---|
| *cellBarred*<br>barred means the cell is barred, as defined in TS 36.304 [4]. |
| *cellReservedForOperatorUse*<br>As defined in TS 36.304 [4]. |

| |
|---|
| *plmn-IdentityList*<br>List of PLMN identities. The first listed *PLMN-Identity* is the primary PLMN. |
| *p-Max*<br>Value applicable for the cell. If absent the UE applies the maximum power according to the UE capability. |
| *q-QualMin*<br>Parameter "$Q_{qualmin}$" in TS 36.304 [4]. If *cellSelectionInfo-v920* is not present, the UE applies the (default) value of negative infinity for $Q_{qualmin}$. |
| *q-QualMinComb*<br>If this field is present, the UE shall, when performing RSRQ measurements, measure RSSI over all OFDM symbols and use a wider bandwidth in accordance with TS 36.133 [16] and TS 36.214 [16], and apply the value of this field for the parameter "$Q_{qualmin}$" in TS 36.304 [4]. Otherwise, the UE applies the value of *q-Qualmin* instead. |
| *q-QualMinOffset*<br>Parameter "$Q_{qualminoffset}$" in TS 36.304 [4]. Actual value $Q_{qualminoffset}$ = IE value [dB]. If *cellSelectionInfo-v920* is not present or the field is not present, the UE applies the (default) value of 0 dB for $Q_{qualminoffset}$. Affects the minimum required quality level in the cell. |
| *q-QualMinRev*<br>If this field is present, the UE shall, when performing RSRQ measurements, measure RSSI over all OFDM symbols in accordance with TS 36.214 [16] and apply the value of this field for the parameter "$Q_{qualmin}$" in TS 36.304 [4]. Otherwise, the UE applies the value of *q-Qualmin* instead. |
| *q-QualMinWB*<br>If this field is present, the UE shall, when performing RSRQ measurements, use a wider bandwidth in accordance with TS 36.133 [16] and apply the value of this field for the parameter "$Q_{qualmin}$" in TS 36.304 [4]. Otherwise, the UE applies the value of *q-Qualmin* instead. |
| *q-RxLevMinOffset*<br>Parameter $Q_{rxlevminoffset}$ in TS 36.304 [4]. Actual value $Q_{rxlevminoffset}$ = IE value * 2 [dB]. If absent, the UE applies the (default) value of 0 dB for $Q_{rxlevminoffset}$. Affects the minimum required Rx level in the cell. |
| *sib-MappingInfo*<br>List of the SIBs mapped to this *SystemInformation* message. There is no mapping information of SIB2; it is always present in the first *SystemInformation* message listed in the *schedulingInfoList* list. |
| *si-Periodicity*<br>Periodicity of the SI-message in radio frames, such that rf8 denotes 8 radio frames, rf16 denotes 16 radio frames, and so on. |
| *si-WindowLength*<br>Common SI scheduling window for all SIs. Unit in milliseconds, where ms1 denotes 1 millisecond, ms2 denotes 2 milliseconds and so on. |
| *systemInfoValueTag*<br>Common for all SIBs other than MIB, SIB1, SIB10, SIB11, SIB12 and SIB14. Change of MIB and SIB1 is detected by acquisition of the corresponding message. |
| *trackingAreaCode*<br>A *trackingAreaCode* that is common for all the PLMNs listed. |

FIG.13B

| Conditional presence | Explanation |
|---|---|
| FBI-max | The field is mandatory present if *freqBandIndicator* (i.e. without suffix) is set to *maxFBI*. Otherwise the field is not present. |
| mFBI-max | The field is mandatory present if one or more entries in *multiBandInfoList* (i.e. without suffix, introduced in -v8h0) is set to *maxFBI*. Otherwise the field is not present. |
| RSRQ | The field is mandatory present if SIB3 is being broadcast and *threshServingLowQ* is present in SIB3; otherwise optionally present, Need OP. |
| RSRQ1 | The field is optionally present, need OP if *cellSelectionInfo-v920* is present; otherwise it it not present. |
| TDD | This field is mandatory present for TDD; it is not present for FDD and the UE shall delete any existing value for this field. |
| TDD-OR | The field is optional present for TDD, need OR; it is not present for FDD. |
| WB-RSRQ | The field is optionally present, need OP if the measurement bandwidth indicated by *allowedMeasBandwidth* in *systemInformationBlockType3* is 50 resource blocks or larger; otherwise it is not present. |

FIG.14

```
-- ASN1START

SystemInformationBlockType3 ::=        SEQUENCE {
    cellReselectionInfoCommon              SEQUENCE {
        q-Hyst                                 ENUMERATED {
                                                   dB0, dB1, dB2, dB3, dB4, dB5, dB6, dB8, dB10,
                                                   dB12, dB14, dB16, dB18, dB20, dB22, dB24},
        speedStateReselectionPars              SEQUENCE {
            mobilityStateParameters                MobilityStateParameters,
            q-HystSF                               SEQUENCE {
                sf-Medium                              ENUMERATED {
                                                           dB-6, dB-4, dB-2, dB0},
                sf-High                                ENUMERATED {
                                                           dB-6, dB-4, dB-2, dB0}
            }
        }                                                                              OPTIONAL        -- Need OP
    },
    cellReselectionServingFreqInfo         SEQUENCE {
        s-NonIntraSearch                       ReselectionThreshold           OPTIONAL,       -- Need OP
        threshServingLow                       ReselectionThreshold,
        cellReselectionPriority                CellReselectionPriority
    },
    intraFreqCellReselectionInfo           SEQUENCE {
        q-RxLevMin                             Q-RxLevMin,
        p-Max                                  P-Max                          OPTIONAL,       -- Need OP
        s-IntraSearch                          ReselectionThreshold           OPTIONAL,       -- Need OP
        allowedMeasBandwidth                   AllowedMeasBandwidth           OPTIONAL,       -- Need OP
        presenceAntennaPort1                   PresenceAntennaPort1,
        neighCellConfig                        NeighCellConfig,
        t-ReselectionEUTRA                     T-Reselection,
        t-ReselectionEUTRA-SF                  SpeedStateScaleFactors         OPTIONAL        -- Need OP
    },
    ...,
    lateNonCriticalExtension               OCTET STRING                   OPTIONAL,
    [[   s-IntraSearch-v920                SEQUENCE {
                s-IntraSearchP-r9                  ReselectionThreshold,
                s-IntraSearchQ-r9                  ReselectionThresholdQ-r9
         }                                                                 OPTIONAL,       -- Need OP
         s-NonIntraSearch-v920             SEQUENCE {
                s-NonIntraSearchP-r9               ReselectionThreshold,
                s-NonIntraSearchQ-r9               ReselectionThresholdQ-r9
         }                                                                 OPTIONAL,       -- Need OP
         q-QualMin-r9                      Q-QualMin-r9                    OPTIONAL,       -- Need OP
         threshServingLowQ-r9              ReselectionThresholdQ-r9        OPTIONAL        -- Need OP
    ]],
    [[   q-QualMinWB-r11                   Q-QualMin-r9                    OPTIONAL    -- Cond WB-RSRQ
    ]],
    [[   q-QualMinRev-r12                  Q-QualMin-r9                    OPTIONAL,   -- Cond RSRQ1
         q-QualMinComb-r12                 Q-QualMin-r9                    OPTIONAL    -- Cond RSRQ1
    ]]
}

-- ASN1STOP
```

FIG.15A

| SystemInformationBlockType3 field descriptions |
|---|
| allowedMeasBandwidth <br> If absent, the value corresponding to the downlink bandwidth indicated by the *dl-Bandwidth* included in *MasterInformationBlock* applies. |
| cellReselectionInfoCommon <br> Cell re-selection information common for cells. |

| |
|---|
| q-QualMin <br> Parameter "$Q_{qualmin}$" in TS 36.304 [4], applicable for intra-frequency neighrbour cells. If the field is not present, the UE applies the (default) value of negative infinity for $Q_{qualmin}$. |
| q-QualMinComb <br> If this field is present, the UE shall, when performing RSRQ measurements, measure RSSI over all OFDM symbols and use a wider bandwidth in accordance with TS 36.133 [16] and TS 36.214 [16], and apply the value of this field for the parameter "$Q_{qualmin}$" in TS 36.304 [4]. Otherwise, the UE applies the value of *q-Qualmin* instead. |
| q-QualMinRev <br> If this field is present, the UE shall, when performing RSRQ measurements, measure RSSI over all OFDM symbols in accordance with TS 36.214 [16] and apply the value of this field for the parameter "$Q_{qualmin}$" in TS 36.304 [4]. Otherwise, the UE applies the value of *q-Qualmin* instead. |
| q-QualMinWB <br> If this field is present, the UE shall, when performing RSRQ measurements, use a wider bandwidth in accordance with TS 36.133 [16] and apply the value of this field for the parameter "$Q_{qualmin}$" in TS 36.304 [4]. Otherwise, the UE applies the value of *q-Qualmin* instead. |
| q-RxLevMin <br> Parameter "$Q_{rxlevmin}$" in TS 36.304 [4], applicable for intra-frequency neighbour cells. |
| s-IntraSearch <br> Parameter "$S_{IntraSearchP}$" in TS 36.304 [4]. If the field *s-IntraSearchP* is present, the UE applies the value of *s-IntraSearchP* instead. Otherwise if neither *s-IntraSearch* nor *s-IntraSearchP* is present, the UE applies the (default) value of infinity for $S_{IntraSearchP}$. |
| s-IntraSearchP <br> Parameter "$S_{IntraSearchP}$" in TS 36.304 [4]. See descriptions under *s-IntraSearch*. |
| s-IntraSearchQ <br> Parameter "$S_{IntraSearchQ}$" in TS 36.304 [4]. If the field is not present, the UE applies the (default) value of 0 dB for $S_{IntraSearchQ}$. |
| s-NonIntraSearch <br> Parameter "$S_{nonIntraSearchP}$" in TS 36.304 [4]. If the field *s-NonIntraSearchP* is present, the UE applies the value of *s-NonIntraSearchP* instead. Otherwise if neither *s-NonIntraSearch* nor *s-NonIntraSearchP* is present, the UE applies the (default) value of infinity for $S_{nonIntraSearchP}$. |
| s-NonIntraSearchP <br> Parameter "$S_{nonIntraSearchP}$" in TS 36.304 [4]. See descriptions under *s-NonIntraSearch*. |
| s-NonIntraSearchQ <br> Parameter "$S_{nonIntraSearchQ}$" in TS 36.304 [4]. If the field is not present, the UE applies the (default) value of 0 dB for $S_{nonIntraSearchQ}$. |
| speedStateReselectionPars <br> Speed dependent reselection parameters, see TS 36.304 [4]. If this field is absent, i.e, *mobilityStateParameters* is also not present, UE behaviour is specified in TS 36.304 [4]. |
| threshServingLow <br> Parameter "$Thresh_{Serving, LowP}$" in TS 36.304 [4]. |
| threshServingLowQ <br> Parameter "$Thresh_{Serving, LowQ}$" in TS 36.304 [4]. |
| t-ReselectionEUTRA <br> Parameter "$Treselection_{EUTRA}$" in TS 36.304 [4]. |
| t-ReselectionEUTRA-SF <br> Parameter "Speed dependent ScalingFactor for $Treselection_{EUTRA}$" in TS 36.304 [4]. If the field is not present, the UE behaviour is specified in TS 36.304 [4]. |

FIG.15B

| Conditional presence | Explanation |
|---|---|
| *RSRQ1* | The field is optionally present, need OP if *q-QualMin-r9* is present; otherwise it it not present. |
| *WB-RSRQ* | The field is optionally present, need OP if the measurement bandwidth indicated by *allowedMeasBandwidth* is 50 resource blocks or larger; otherwise it is not present. |

FIG.16

```
-- ASN1START

SystemInformationBlockType5 ::=     SEQUENCE {
    interFreqCarrierFreqList         InterFreqCarrierFreqList,
    ...,
    lateNonCriticalExtension         OCTET STRING (CONTAINING SystemInformationBlockType5-v8h0-IEs)    OPTIONAL
}

SystemInformationBlockType5-v8h0-IEs ::=    SEQUENCE {
    interFreqCarrierFreqList-v8h0 SEQUENCE (SIZE (1..maxFreq)) OF InterFreqCarrierFreqInfo-v8h0    OPTIONAL, -- Need OP
    nonCriticalExtension          SystemInformationBlockType5-v9e0-IEs    OPTIONAL
}

SystemInformationBlockType5-v9e0-IEs ::=    SEQUENCE {
    interFreqCarrierFreqList-v9e0    SEQUENCE (SIZE (1..maxFreq)) OF InterFreqCarrierFreqInfo-v9e0    OPTIONAL, -- Need OR
    nonCriticalExtension             SystemInformationBlockType5-v12xy-IEs                           OPTIONAL
}

SystemInformationBlockType5-v12xy-IEs ::=   SEQUENCE {
    interFreqCarrierFreqList-v12xy SEQUENCE (SIZE (1..maxFreq)) OF InterFreqCarrierFreqInfo-v9e0    OPTIONAL, -- Need OR
    nonCriticalExtension           SEQUENCE {}                                                       OPTIONAL
}

InterFreqCarrierFreqList ::=    SEQUENCE (SIZE (1..maxFreq)) OF InterFreqCarrierFreqInfo InterFreqCarrierFreqInfo ::= SEQUENCE {
    dl-CarrierFreq             ARFCN-ValueEUTRA,
    q-RxLevMin                 Q-RxLevMin,
    p-Max                      P-Max                                OPTIONAL,    -- Need OP
    t-ReselectionEUTRA         T-Reselection,
    ...
            threshX-HighQ-r9           ReselectionThresholdQ-r9,
            threshX-LowQ-r9            ReselectionThresholdQ-r9
        }                                                           OPTIONAL    -- Cond RSRQ
    ]],
    [[  q-QualMinWB-r11        Q-QualMin-r9                         OPTIONAL    -- Cond WB-RSRQ
    ]]
}

InterFreqCarrierFreqInfo-v8h0 ::=          SEQUENCE {
    multiBandInfoList          MultiBandInfoList                    OPTIONAL    -- Need OR
}

InterFreqCarrierFreqInfo-v9e0 ::=   SEQUENCE {
    dl-CarrierFreq-v9e0        ARFCN-ValueEUTRA-v9e0    OPTIONAL,   -- Cond dl-FreqMax
    multiBandInfoList-v9e0     MultiBandInfoList-v9e0   OPTIONAL    -- Need OR
}

InterFreqCarrierFreqInfo-v12xy ::=  SEQUENCE {
    q-QualMinRev-r12           Q-QualMin-r9                         OPTIONAL,   -- Cond RSRQ1
    q-QualMinComb-r12          Q-QualMin-r9                         OPTIONAL    -- Cond RSRQ1
}

InterFreqNeighCellList ::=      SEQUENCE (SIZE (1..maxCellInter)) OF InterFreqNeighCellInfo InterFreqNeighCellInfo ::=      SEQUENCE {
    physCellId                 PhysCellId,
    q-OffsetCell               Q-OffsetRange
}

InterFreqBlackCellList ::=      SEQUENCE (SIZE (1..maxCellBlack)) OF PhysCellIdRange

-- ASN1STOP
```

FIG.17A

| SystemInformationBlockType5 field descriptions |
|---|
| *interFreqBlackCellList*<br>List of blacklisted inter-frequency neighbouring cells. |
| *interFreqCarrierFreqList*<br>List of neighbouring inter-frequencies. E-UTRAN does not configure more than one entry for the same physical frequency regardless of the E-ARFCN used to indicate this. If E-UTRAN includes *interFreqCarrierFreqList-v8h0* and/ or *interFreqCarrierFreqList-v9e0* it includes the same number of entries, and listed in the same order, as in *interFreqCarrierFreqList* (i.e. without suffix). |
| *interFreqNeighCellList*<br>List of inter-frequency neighbouring cells with specific cell re-selection parameters. |
| *multiBandInfoList*<br>Indicates the list of frequency bands in addition to the band represented by *dl-CarrierFreq* for which cell reselection parameters are common. E-UTRAN indicates at most *maxMultiBands* frequency bands (i.e. the total number of entries across both *multiBandInfoList* and *multiBandInfoList-v9e0* is below this limit). |
| *p-Max*<br>Value applicable for the neighbouring E-UTRA cells on this carrier frequency. If absent the UE applies the maximum power according to the UE capability. |
| *q-OffsetCell*<br>Parameter "$Qoffset_{s,n}$" in TS 36.304 [4]. |
| *q-OffsetFreq*<br>Parameter "$Qoffset_{frequency}$" in TS 36.304 [4]. |
| *q-QualMin*<br>Parameter "$Q_{qualmin}$" in TS 36.304 [4]. If the field is not present, the UE applies the (default) value of negative infinity for $Q_{qualmin}$. |
| *q-QualMinComb*<br>If this field is present, the UE shall, when performing RSRQ measurements, measure RSSI over all OFDM symbols and use a wider bandwidth in accordance with TS 36.133 [16] and TS 36.214 [16], and apply the value of this field for the parameter "$Q_{qualmin}$" in TS 36.304 [4]. Otherwise, the UE applies the value of *q-Qualmin* instead. |
| *q-QualMinRev*<br>If this field is present, the UE shall, when performing RSRQ measurements, measure RSSI over all OFDM symbols in accordance with TS 36.214 [16] and apply the value of this field for the parameter "$Q_{qualmin}$" in TS 36.304 [4]. Otherwise, the UE applies the value of *q-Qualmin* instead. |
| *q-QualMinWB*<br>If this field is present, the UE shall, when performing RSRQ measurements, use a wider bandwidth in accordance with TS 36.133 [16] and apply the value of this field for the parameter "$Q_{qualmin}$" in TS 36.304 [4]. Otherwise, the UE applies the value of *q-Qualmin* instead. |
| *threshX-High*<br>Parameter "$Thresh_{X, HighP}$" in TS 36.304 [4]. |
| *threshX-HighQ*<br>Parameter "$Thresh_{X, HighQ}$" in TS 36.304 [4]. |
| *threshX-Low*<br>Parameter "$Thresh_{X, LowP}$" in TS 36.304 [4]. |
| *threshX-LowQ*<br>Parameter "$Thresh_{X, LowQ}$" in TS 36.304 [4]. |
| *t-ReselectionEUTRA*<br>Parameter "$Treselection_{EUTRA}$" in TS 36.304 [4]. |
| *t-ReselectionEUTRA-SF*<br>Parameter "Speed dependent ScalingFactor for $Treselection_{EUTRA}$" in TS 36.304 [4]. If the field is not present, the UE behaviour is specified in TS 36.304 [4]. |

FIG.17B

| Conditional presence | Explanation |
|---|---|
| dl-FreqMax | The field is mandatory present if, for the corresponding entry in *InterFreqCarrierFreqList* (i.e. without suffix), *dl-CarrierFreq* (i.e. without suffix) is set to *maxEARFCN*. Otherwise the field is not present. |
| RSRQ | The field is mandatory present if *threshServingLowQ* is present in *systemInformationBlockType3*; otherwise it is not present. |
| RSRQ1 | The field is optionally present, need OP if *q-QualMin-r9* is present; otherwise it it not present. |
| WB-RSRQ | The field is optionally present, need OP if the measurement bandwidth indicated by *allowedMeasBandwidth* is 50 resource blocks or larger; otherwise it is not present. |

FIG.22A

```
-- ASN1START

UE-EUTRA-Capability ::=          SEQUENCE {
    accessStratumRelease             AccessStratumRelease,
    ue-Category                      INTEGER (1..5),
    pdcp-Parameters                  PDCP-Parameters,
    phyLayerParameters               PhyLayerParameters,
    rf-Parameters                    RF-Parameters,
    measParameters                   MeasParameters,
    featureGroupIndicators           BIT STRING (SIZE (32))          OPTIONAL,
    interRAT-Parameters              SEQUENCE {
        utraFDD                          IRAT-ParametersUTRA-FDD         OPTIONAL,
        utraTDD128                       IRAT-ParametersUTRA-TDD128      OPTIONAL,
        utraTDD384                       IRAT-ParametersUTRA-TDD384      OPTIONAL,
        utraTDD768                       IRAT-ParametersUTRA-TDD768      OPTIONAL,
        geran                            IRAT-ParametersGERAN            OPTIONAL,
        cdma2000-HRPD                    IRAT-ParametersCDMA2000-HRPD    OPTIONAL,
        cdma2000-1xRTT                   IRAT-ParametersCDMA2000-1XRTT   OPTIONAL
    },
    nonCriticalExtension             UE-EUTRA-Capability-v920-IEs    OPTIONAL
}

<< skip unchanged part >>
UE-EUTRA-Capability-v1170-IEs ::= SEQUENCE {
    phyLayerParameters-v1170         PhyLayerParameters-v1170
    ue-Category-v1170                INTEGER (9..10)                 OPTIONAL,
    nonCriticalExtension             UE-EUTRA-Capability-v12xy-IEs   OPTIONAL,
}

UE-EUTRA-Capability-v12xy-IEs ::= SEQUENCE {
    measParameters-v12xy             MeasParameters-v12xy            OPTIONAL
    nonCriticalExtension             SEQUENCE {}                     OPTIONAL
}

<< skip unchanged part >>

MeasParameters-v12xy ::=         SEQUENCE {
    measRSRQ-Allsymbol-r12           ENUMERATED {supported}          OPTIONAL
}

<< skip unchanged part >>

-- ASN1STOP
```

FIG.22B

| UE-EUTRA-Capability field descriptions | FDD/ TDD diff |
|---|---|
| measRSRQ-AllSymbol *Indicates whether the UE can perform RSRQ measurements with all OFDM symbols.* | |

FIG.23

```
-- ASN1START

MeasObjectEUTRA ::=                          SEQUENCE {
    carrierFreq                              ARFCN-ValueEUTRA,
    allowedMeasBandwidth                     AllowedMeasBandwidth,
    presenceAntennaPort1                     PresenceAntennaPort1,
    neighCellConfig                          NeighCellConfig,
    offsetFreq                               Q-OffsetRange                       DEFAULT dB0,
    -- Cell list
    cellsToRemoveList                        CellIndexList             OPTIONAL,     -- Need ON
    cellsToAddModList                        CellsToAddModList         OPTIONAL,     -- Need ON
    -- Black list
    blackCellsToRemoveList                   CellIndexList             OPTIONAL,     -- Need ON
    blackCellsToAddModList                   BlackCellsToAddModList    OPTIONAL,     -- Need ON
    cellForWhichToReportCGI                  PhysCellId                OPTIONAL,     -- Need ON
    ...,
    [[measCycleSCell-r10                     MeasCycleSCell-r10        OPTIONAL,     -- Need ON
        measSubframePatternConfigNeigh-r10      MeasSubframePatternConfigNeigh-r10  OPTIONAL     -- Need ON
    ]],
    [[widebandRSRQ-Meas-r11                  BOOLEAN      OPTIONAL    -- Cond WB-RSRQ
    ]],
    [[altTTT-CellsToRemoveList-r12   CellIndexList                     OPTIONAL,     -- Need ON
        altTTT-CellsToAddModList-r12  AltTTT-CellsToAddModList-r12     OPTIONAL,     -- Need ON
        measRSRQ-Allsymbol-r12                BOOLEAN      OPTIONAL    -- Need ON
    ]]
}

MeasObjectEUTRA-v9e0 ::=                     SEQUENCE {
    carrierFreq-v9e0                         ARFCN-ValueEUTRA-v9e0
}

CellsToAddModList ::=                        SEQUENCE (SIZE (1..maxCellMeas)) OF CellsToAddMod CellsToAddMod ::=    SEQUENCE {
    cellIndex                                INTEGER (1..maxCellMeas),
    physCellId                               PhysCellId,
    cellIndividualOffset                     Q-OffsetRange
}

BlackCellsToAddModList ::=                   SEQUENCE (SIZE (1..maxCellMeas)) OF BlackCellsToAddMod BlackCellsToAddMod ::=       SEQUENCE {
    cellIndex                                INTEGER (1..maxCellMeas),
    physCellIdRange                          PhysCellIdRange
}

MeasCycleSCell-r10 ::=                       ENUMERATED {sf160, sf256, sf320, sf512,
                                                        sf640, sf1024, sf1280, spare1}

MeasSubframePatternConfigNeigh-r10 ::=       CHOICE {
    release                                      NULL,
    setup                                        SEQUENCE {
        measSubframePatternNeigh-r10                MeasSubframePattern-r10,
        measSubframeCellList-r10                    MeasSubframeCellList-r10        OPTIONAL     -- Cond always
    }
}

MeasSubframeCellList-r10 ::=    SEQUENCE (SIZE (1..maxCellMeas)) OF PhysCellIdRange AltTTT-CellsToAddModList-r12 ::=     SEQUENCE (SIZE (1..maxCellMeas)) OF AltTTT-CellsToAddMod-r12

AltTTT-CellsToAddMod-r12 ::=SEQUENCE {
    cellIndex                                INTEGER (1..maxCellMeas),
    physCellIdRange                          PhysCellIdRange
}

-- ASN1STOP
```

FIG.24A

| MeasObjectEUTRA field descriptions |
| --- |
| *altTTT-CellsToAddModList*<br>List of cells to add/ modify in the cell list for which the alternative time to trigger specified by *alternativeTimeToTrigger* in *reportConfigEUTRA*, if configured, applies. |
| *altTTT-CellsToRemoveList*<br>List of cells to remove from the list of cells for alternative time to trigger. |
| *blackCellsToAddModList*<br>List of cells to add/ modify in the black list of cells. |
| *blackCellsToRemoveList*<br>List of cells to remove from the black list of cells. |
| *carrierFreq*<br>Identifies E-UTRA carrier frequency for which this configuration is valid. E-UTRAN does not configure more than one measurement object for the same physical frequency regardless of the E-ARFCN used to indicate this. |
| *cellIndex*<br>Entry index in the cell list. An entry may concern a range of cells, in which case this value applies to the entire range. |
| *cellIndividualOffset*<br>Cell individual offset applicable to a specific cell. Value dB-24 corresponds to -24 dB, dB-22 corresponds to -22 dB and so on. |
| *cellsToAddModList*<br>List of cells to add/ modify in the cell list. |
| *cellsToRemoveList*<br>List of cells to remove from the cell list. |
| *measCycleSCell*<br>The parameter is used only when an SCell is configured on the frequency indicated by the *measObject* and is in deactivated state, see TS 36.133 [16, 8.3.3]. E-UTRAN configures the parameter whenever an SCell is configured on the frequency indicated by the *measObject*, but the field may also be signalled when an SCell is not configured. Value *sf160* corresponds to 160 sub-frames, *sf256* corresponds to 256 sub-frames and so on. |
| *measRSRQ-Allsymbol*<br>If this field is set to *TRUE*, the UE shall, when performing RSRQ measurements, measure RSSI over all OFDM symbols in accordance with TS 36.214 [16]. |
| *measSubframeCellList*<br>List of cells for which *measSubframePatternNeigh* is applied. |
| *measSubframePatternNeigh*<br>Time domain measurement resource restriction pattern applicable to neighbour cell RSRP and RSRQ measurements on the carrier frequency indicated by *carrierFreq*. For cells in *measSubframeCellList* the UE shall assume that the subframes indicated by *measSubframePatternNeigh* are non-MBSFN subframes. |
| *offsetFreq*<br>Offset value applicable to the carrier frequency. Value dB-24 corresponds to -24 dB, dB-22 corresponds to -22 dB and so on. |
| *physCellId*<br>Physical cell identity of a cell in the cell list. |
| *physCellIdRange*<br>Physical cell identity or a range of physical cell identities of cells in the black list. |
| *widebandRSRQ-Meas*<br>If this field is set to *TRUE*, the UE shall, when performing RSRQ measurements, use a wider bandwidth in accordance with TS 36.133 [16]. |

FIG.24B

| Conditional presence | Explanation |
|---|---|
| always | The field is mandatory present. |
| WB-RSRQ | The field is optionally present, need ON, if the measurement bandwidth indicated by *allowedMeasBandwidth* is 50 resource blocks or larger; otherwise it is not present and the UE shall delete any existing value for this field, if configured. |

USER APPARATUS, BASE STATION, CELL SELECTION CONTROL METHOD, AND PARAMETER TRANSMISSION METHOD

TECHNICAL FIELD

The present invention relates to a technique of measurement of signal reception quality in a mobile communication system.

BACKGROUND ART

In a mobile communication system of an LTE scheme, a user apparatus UE in an RRC idle state measures RSRP (Reference Signal Received Power)/RSRQ (Reference Signal Received Quality) of a signal transmitted from a base station eNB of a residing cell or a base station eNB of a neighbour cell to perform cell selection and/or cell reselection based on the measurement result (refer to non-patent document 1, for example).

Also, the user apparatus UE in an RRC connected state measures RSRP/RSRQ of a signal transmitted from a base station eNB of a residing cell or a base station eNB of a neighbour cell, and notifies the base station eNB of the measurement result as a measurement report, so that the base station eNB performs control of handover, for example, based on the measurement report (refer to non-patent document 2, for example).

RELATED ART DOCUMENT

Non Patent Document

[NON PATENT DOCUMENT 1] 3GPP TS 36.304 V12.0.0 (2014-03)
[NON PATENT DOCUMENT 2] 3GPP TS 36.331 V12.1.0 (2014-03)
[NON PATENT DOCUMENT 3] 3GPP TS 36.214 V11.1.0 (2012-12)

Patent Document

[PATENT DOCUMENT 1] JP5453554

SUMMARY OF THE INVENTION

Problem to be Solved by the Invention

RSRP that the user apparatus UE measures as described above is an average of power of resource elements that carry reference signals (CRS) within the measurement frequency bandwidth (considered measurement frequency bandwidth) as defined in the non-patent document 3.

Also, RSRQ is, as defined in the non-patent document 3, calculated (measured) by "N×RSRP/RSSI". Here, N is the number of resource blocks of measurement bandwidth (E-UTRA carrier RSSI measurement bandwidth) of RSSI. Also, measurement of RSRP and RSSI in RSRQ is basically performed in the same set of resource blocks. By the way, RSSI is an abbreviation of Received Signal Strength Indicator, which is a sum of received power of all signals of a desired signal from the serving cell (residing cell), an interference signal of a neighbour cell, a noise signal due to thermal noise, and the like.

A measurement method of RSRQ is described with reference to FIG. 1. FIG. 1A is a diagram for explaining a conventional (current) measurement method of RSRQ. In the conventional measurement of RSRQ, RSRP/RSSI is measured for six resource blocks of the center of the band used in LTE. As to RSSI, OFDM symbols to which reference signals of RSRP measurement targets are mapped become measurement targets. FIG. 1A shows OFDM symbols for a cell #1 and a cell #2. Since cell selection and the like using the conventional RSRQ is introduced in Rel9 of LTE, the RSRQ is called Rel9RSRQ for the sake of convenience.

As a measurement method of the conventional RSRQ, in addition to the method of measuring RSRP/RSSI of six resource blocks as mentioned above, there is a method for measuring RSRQ with a band wider than the six resource blocks (refer to patent document 1 and the like, for example). The RSRQ is called wideband RSRQ for the sake of convenience. An example of the wideband (bandwidth) is a band of 50 resource blocks or a band of more than it.

On the other hand, as a new RSRQ measurement method, as shown in FIG. 1B, a method is proposed in which measurement of RSSI is performed in all OFDM symbols not limited to OFDM symbols to which the reference signals are mapped. More particularly, RSSI of all OFDM symbols is an average RSSI per 10 OFDM symbols. The RSRQ of the new measurement method is called all symbol RSRQ for the sake of convenience.

In LTE, cell selection/cell reselection and the like is performed by measuring RSRQ and the like and by using the measurement value and a parameter such as a threshold and the like. However, in the conventional technique, since the user apparatus UE does not have a parameter such as a threshold applicable to the above-mentioned all symbol RSRQ, there is a problem in that it is not possible to properly perform cell selection/cell reselection by using the all symbol RSRQ. Also, in measurement in an RRC connected state, instruction (configuration) of a measurement method (what measurement amount to measure, and the like) is performed from the base station eNB to the user apparatus UE. However, in the conventional technique, there is a problem in that the base station eNB cannot perform instruction on all symbol RSRQ to the user apparatus UE.

The present invention is contrived in view of the above-mentioned points, and an object of the present invention is to provide a technique that enables a user apparatus to obtain a parameter to be used for performing cell selection/cell reselection by measuring signal reception quality in all symbols, and to perform cell selection/cell reselection.

Also, an object of the present invention is to provide a technique that enables a base station to perform instruction of measurement of signal reception quality in all symbols to a user apparatus.

Means for Solving the Problem

According to an embodiment of the present invention, there is provided a user apparatus in a mobile communication system including a base station and the user apparatus, including:

reception means that receives, from the base station, a parameter for all symbols that is used when performing cell selection processing or cell reselection processing based on all symbol signal reception quality that is signal reception quality based on measurement in all OFDM symbols; and cell selection control means that performs measurement of the all symbol signal reception quality, and performs cell selection processing or cell reselection processing by using a result of the measurement and the parameter for all symbols received by the reception means.

According to an embodiment of the present invention, there is provided a user apparatus in a mobile communication system including a base station and the user apparatus, including:

reception means that receives, from the base station, a normal parameter that is used when performing cell selection processing or cell reselection processing based on normal signal reception quality that is signal reception quality based on measurement in a band of a predetermined number of resource blocks and predetermined OFDM symbols, a parameter for all symbols that is used when performing cell selection processing or cell reselection processing based on all symbol signal reception quality that is signal reception quality based on measurement in all OFDM symbols, and a parameter for wideband that is used when performing cell selection processing or cell reselection processing based on wideband signal reception quality that is signal reception quality based on measurement in a band wider than a band of a predetermined number of resource blocks; and cell selection control means that, based on the normal parameter, the parameter for all symbols, and the parameter for wideband, calculates a parameter for wideband all symbols that is used when performing cell selection processing or cell reselection processing based on wideband all symbol signal reception quality that is signal reception quality based on measurement in a band wider than a band of the predetermined number of resource blocks and all OFDM symbols, performs measurement of the wideband all symbol signal reception quality, and performs cell selection processing or cell reselection processing by using a result of the measurement and the calculated parameter for wideband all symbols.

According to an embodiment of the present invention, there is provided a user apparatus in a mobile communication system including a base station and the user apparatus, including:

transmission means that transmits, to the base station, capability information indicating that the user apparatus has a capability to measure all symbol signal reception quality that is signal reception quality based on measurement in all OFDM symbols; and measurement control means that receives, from the base station that receives the capability information, measurement configuration information instructing to measure the all symbol signal reception quality, measures the all symbol signal reception quality based on the measurement configuration information, and transmits a measurement report including a result of the measurement to the base station.

According to an embodiment of the present invention, there is provided a base station in a mobile communication system including the base station and a user apparatus, including:

transmission means that transmits a normal parameter that is used when performing cell selection processing or cell reselection processing based on normal signal reception quality that is signal reception quality based on measurement in a band of a predetermined number of resource blocks and predetermined OFDM symbols, a parameter for all symbols that is used when performing cell selection processing or cell reselection processing based on all symbol signal reception quality that is signal reception quality based on measurement in all OFDM symbols, and a parameter for wideband that is used when performing cell selection processing or cell reselection processing based on wideband signal reception quality that is signal reception quality based on measurement in a band wider than a band of a predetermined number of resource blocks.

According to an embodiment of the present invention, there is provided a base station in a mobile communication system including the base station and a user apparatus, including:

reception means that receives, from the user apparatus, capability information indicating that the user apparatus has a capability to measure all symbol signal reception quality that is signal reception quality based on measurement in all OFDM symbols; and setting means that transmits, to the user apparatus, measurement configuration information instructing to measure the all symbol signal reception quality for which the capability information indicates that the user apparatus has measurement capability.

According to an embodiment of the present invention, there is provided a cell selection control method executed by a user apparatus in a mobile communication system including a base station and the user apparatus, including:

a reception step of receiving, from the base station, a parameter for all symbols that is used when performing cell selection processing or cell reselection processing based on all symbol signal reception quality that is signal reception quality based on measurement in all OFDM symbols; and a cell selection control step of performing measurement of the all symbol signal reception quality, and performing cell selection processing or cell reselection processing by using a result of the measurement and the parameter for all symbols received by the reception step.

According to an embodiment of the present invention, there is provided a parameter transmission method executed by a base station in a mobile communication system including the base station and a user apparatus, including:

a transmission step of transmitting a normal parameter that is used when performing cell selection processing or cell reselection processing based on normal signal reception quality that is signal reception quality based on measurement in a band of a predetermined number of resource blocks and predetermined OFDM symbols, a parameter for all symbols that is used when performing cell selection processing or cell reselection processing based on all symbol signal reception quality that is signal reception quality based on measurement in all OFDM symbols, and a parameter for wideband that is used when performing cell selection processing or cell reselection processing based on wideband signal reception quality that is signal reception quality based on measurement in a band wider than a band of a predetermined number of resource blocks.

Effect of the Present Invention

According to an embodiment of the present invention, it becomes possible that a user apparatus obtains a parameter to be used for performing cell selection/cell reselection by measuring signal reception quality in all symbols to perform cell selection/cell reselection.

Also, it becomes possible that a base station performs instruction of measurement of signal reception quality in all symbols to a user apparatus according to a capability of the user apparatus.

BRIEF DESCRIPTION OF THE DRAWINGS

FIG. 5 is a diagram showing an example of a SIB1 message in the first embodiment of the present invention;

FIG. 6A is a diagram showing description examples of fields of SIB1 in the first embodiment of the present invention;

FIG. 6B is a diagram showing description examples of fields of SIB1 in the first embodiment of the present invention;

FIG. 7 is a diagram showing an example of a SIB3 message in the first embodiment of the present invention;

FIG. 8A is a diagram showing description examples of fields of SIB3 in the first embodiment of the present invention;

FIG. 8B is a diagram showing description examples of fields of SIB3 in the first embodiment of the present invention;

FIG. 9 is a diagram showing an example of a SIB5 message in the first embodiment of the present invention;

FIG. 10A is a diagram showing description examples of fields of SIB5 in the first embodiment of the present invention;

FIG. 10B is a diagram showing description examples of fields of SIB5 in the first embodiment of the present invention;

FIG. 12 is a diagram showing an example of a SIB1 message in the example 2-1;

FIG. 13A is a diagram showing description examples of fields of SIB1 in the example 2-1;

FIG. 13B is a diagram showing description examples of fields of SIB1 in the example 2-1;

FIG. 14 is a diagram showing an example of a SIB3 message in the example 2-1;

FIG. 15A is a diagram showing description examples of fields of SIB3 in the example 2-1;

FIG. 15B is a diagram showing description examples of fields of SIB3 in the example 2-1;

FIG. 16 is a diagram showing an example of a SIB5 message in the example 2-1;

FIG. 17A is a diagram showing description examples of fields of SIB5 in the example 2-1;

FIG. 17B is a diagram showing description examples of fields of SIB5 in the example 2-1;

FIG. 22A is a diagram for explaining a capability information notification message in the third embodiment of the present invention;

FIG. 22B is a diagram for explaining a capability information notification message in the third embodiment of the present invention;

FIG. 23 is a diagram showing an example of measurement object (MeasObjectEUTRA IS) in the third embodiment of the present invention;

FIG. 24A is a diagram showing description examples of fields of measurement object (MeasObjectEUTRA IS) in the third embodiment of the present invention;

FIG. 24B is a diagram showing description examples of fields of measurement object (MeasObjectEUTRA IE) in the third embodiment of the present invention;

EMBODIMENTS FOR CARRYING OUT THE INVENTION

In the following, embodiments of the present invention are described with reference to figures. The embodiments described below are merely examples, and the embodiments to which the present invention is applied are not limited to the embodiments below. For example, although the communication system of the present embodiments complies with LTE, the present invention is not limited to LTE, and the present invention can be applied to other schemes. In the specification and the claims, the term "LTE" is used to mean a scheme corresponding to 3GPP Rel-12 or a later release unless specifically stated. Although RSRQ is used as an example of signal reception quality in the following embodiments, signal reception quality of the present invention is not limited to RSRQ.

(Communication System Whole Configuration Example)

Figure 1A:
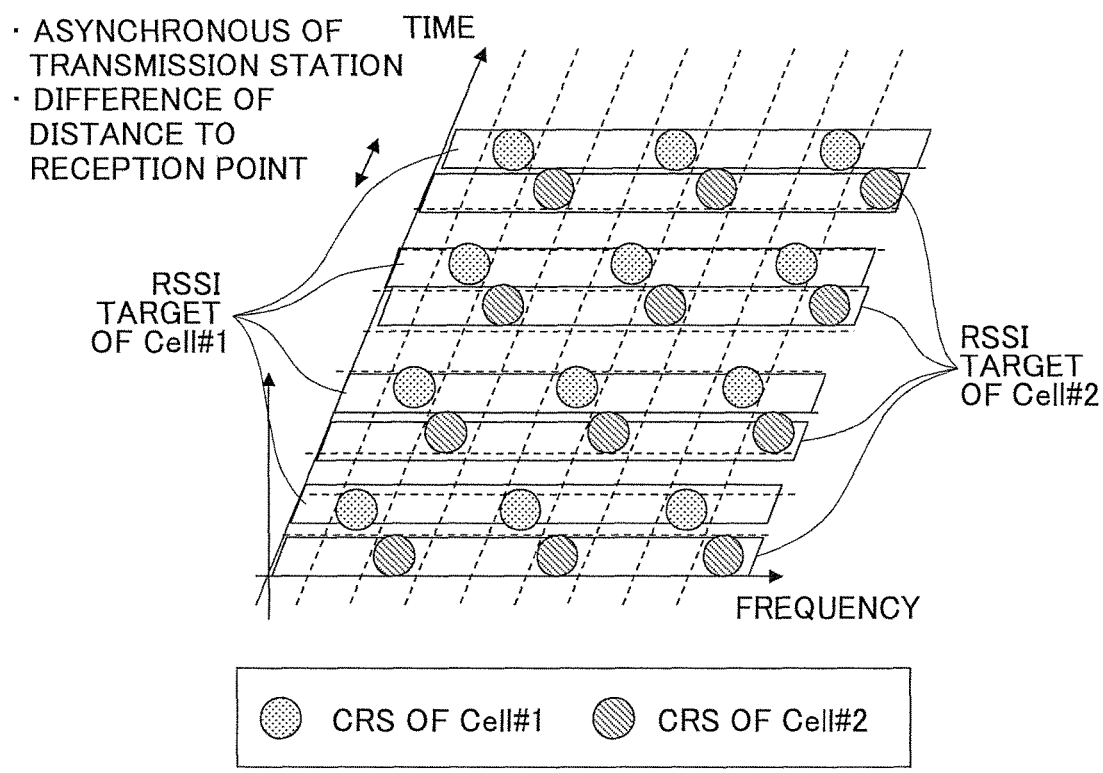
FIG. 1A is a diagram for explaining a new measurement method of RSRQ.
Figure 1B:
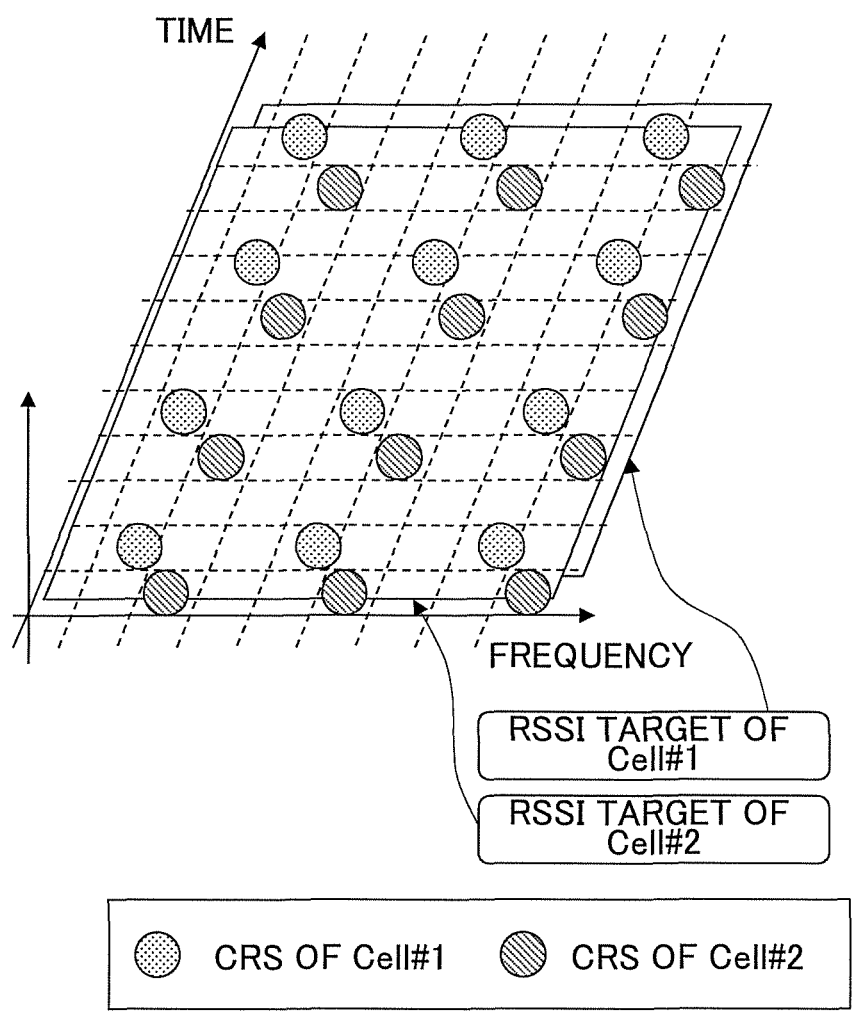
FIG. 1B is a diagram for explaining a new measurement method of RSRQ.
Figure 2:
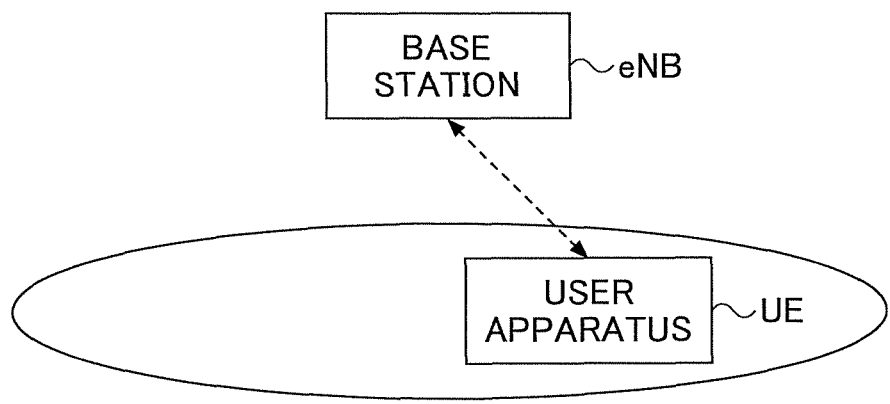
FIG. 2 is a block diagram of a communication system in an embodiment of the present invention.

FIG. 2 shows a block diagram of a communication system in an embodiment (common to first to third embodiments) of the present invention. As shown in FIG. 2, the communication system of the present embodiment includes a base station eNB and a user apparatus UE. FIG. 2 shows one base station eNB and one user apparatus UE. However, this is an example, and a plurality of base stations eNB and a plurality of user apparatuses UE may exist. Also, although FIG. 2 indicates that the user apparatus UE resides in a cell formed by the base station eNB, this is also an example. By the way, to reside in may be referred to as "to camp" or "to camp on".

(On Cell Selection, Cell Reselection)

In the first and the second embodiments described below, transmission of parameters used in cell selection and cell reselection is described. Thus, outline of cell selection and cell reselection in an RRC idle state is described with reference to FIG. 3. The RRC idle state is a state defined in LTE. In short, the RRC idle state roughly corresponds to a state where the user apparatus UE is not performing communication of user data, and is in a waiting state.

Figure 3:
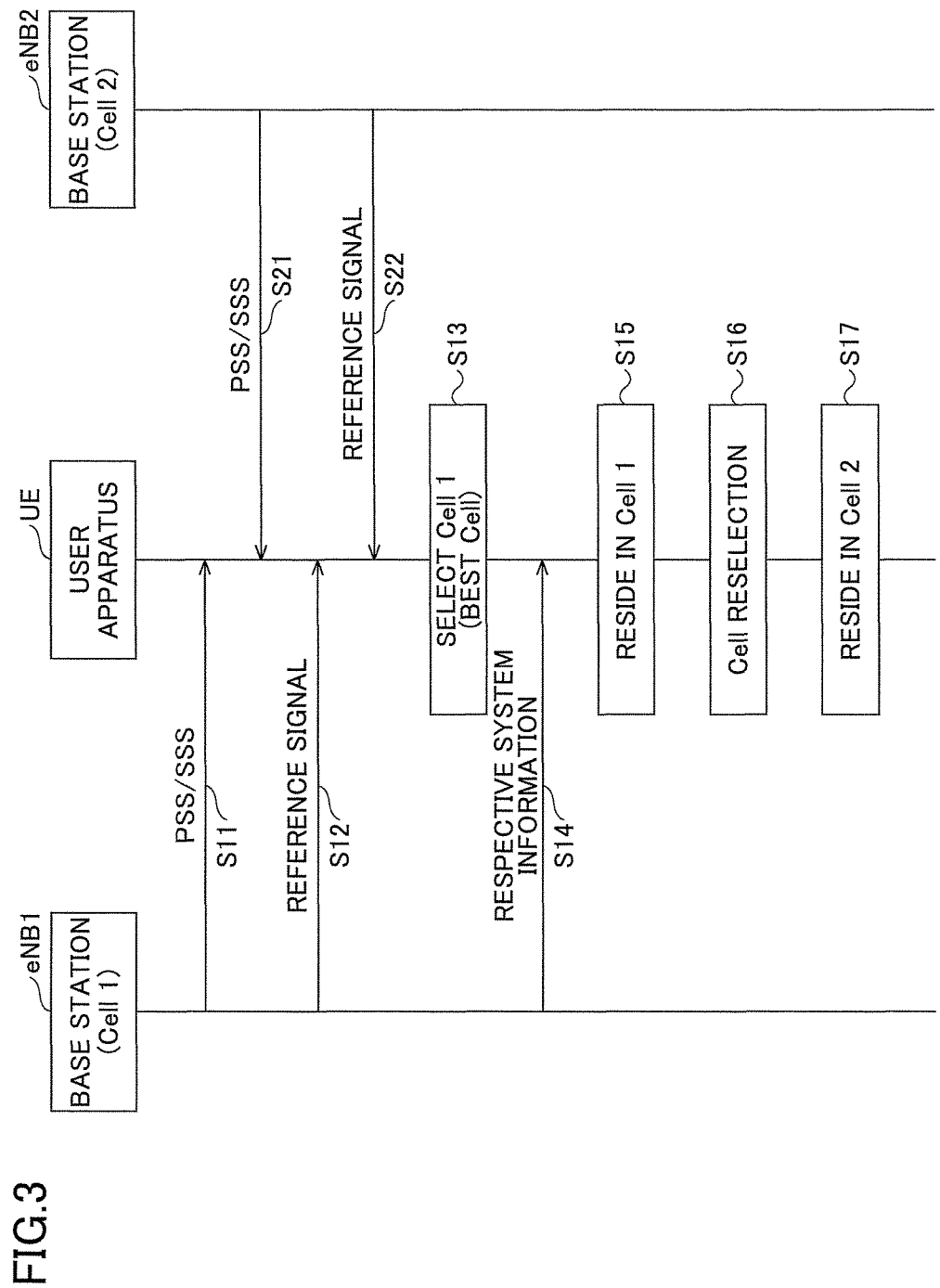
FIG. 3 is a sequence diagram for explaining outline of cell selection and cell reselection in an RRC idle state.

In the example shown in FIG. 3, a base station eNB1 and a base station eNB2 exist, and form a cell 1 and cell 2 respectively. For example, the user apparatus UE is turned ON from OFF, resides in the cell 1 first by cell selection, and next, the user apparatus UE resides in the cell 2 by cell reselection. By the way, although each signal transmitted from the base station eNB to the user apparatus UE in FIG. 3 is transmitted periodically, FIG. 3 shows a flow of signals focusing on reception operation of the user apparatus UE.

In cell selection, the user apparatus UE sequentially searches frequencies that the use apparatus UE supports (cell search). In the stage of cell search, the user apparatus UE receives a synchronization signal (PSS/SSS) from the base station 1, 2 (step 11, 21) to establish synchronization such as timing and to obtain a cell ID (PCI). As to the cell in which synchronization is obtained by the synchronization signal, the user apparatus UE receives a reference signal (CRS) transmitted from the base station eNB to measure RSRP (although it may be RSRQ, RSRP is used in this example in the stage of best cell selection) (step 12, 22).

In step 13, the cell 1 is selected as a cell (best cell) whose RSRP of the reference signal is the highest. The user apparatus UE receives system information (MIB, each SIB) from the base station eNB, and confirms that the cell 1 satisfies a predetermined condition based on a parameter included in SIB 1, and resides in the cell 1 (step 15).

The predetermined condition is, for example, a condition of "Srxlev>0 AND Squal>0" described in the non-patent document 1.

Here, Srxlev=$Q_{rxlevmeas}$−($Q_{rxlevmin}$+$Q_{rxlevminoffset}$)−Pcompensation, and Squal=$Q_{qualmeas}$−($Q_{qualmin}$+$Q_{qualminoffset}$) hold true. Meaning of each symbol is as defined in the non-patent document 1. Especially, $Q_{quaimin}$ is a parameter indicating the minimum required quality in the cell (minimum quality required for residing in the cell).

After that, for example, when a predetermined condition, for example, that RSRP/RSRQ and the like of the cell 1 falls below a threshold is satisfied, the user apparatus UE starts cell reselection operation (step 16). In cell reselection, the user apparatus UE searches neighbour cells, so that the user apparatus UE resides in a neighbour cell where a predetermined condition (including the before-mentioned condition for cell selection, for example) is satisfied. In the example of FIG. 3, the user apparatus UE resides in the cell 2 by the cell reselection (step 17).

As cell reselection, there are reselection of a cell of the same frequency as the frequency of the serving cell (LTE) (intra-frequency), reselection of a cell of LTE of a frequency different from the frequency of the serving cell (inter-frequency), and reselection of a cell of different RAT (Radio Access Technology) (inter-RAT) and the like. SIB3 (SystemInformationBlockType3) includes cell reselection information of intra-frequency. For example, SIB3 includes a parameter ($Q_{qualmin}$ and the like) used as a threshold (or used for calculating the threshold), in which the user apparatus UE starts measurement of a neighbour cell when RSRP/RSRQ of the serving cell falls below the threshold.

Also, SIB5 (SystemInformationBlockType5) includes information on inter-frequency cell reselection. As the information, there are parameters such as target frequencies (EARFCN) of measurement of neighbour cells (Inter-Frequency Measurement), and $Q_{qualmin}$ for each frequency of neighbour cells and the like.

In the following, first and second embodiments are described for an RRC idle state, and a third embodiment is described for an RRC connected state.

First Embodiment

Figure 4:
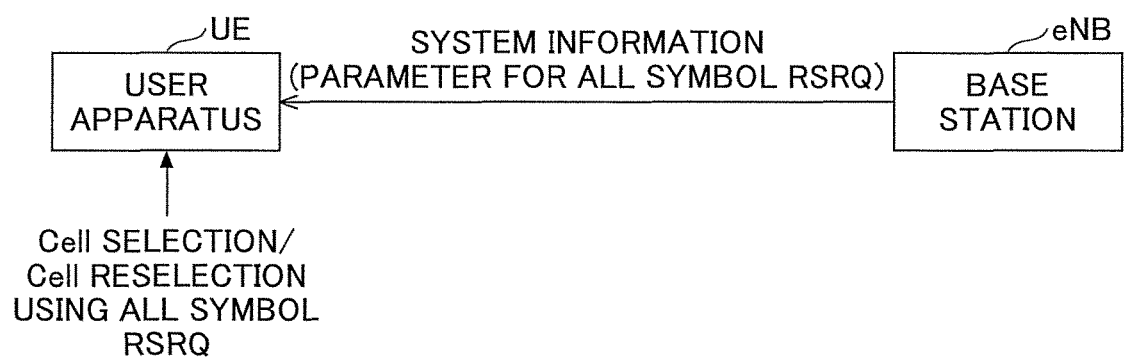
FIG. 4 is a diagram for explaining outline of a first embodiment of the present invention.

First, the first embodiment of the present invention is described. As shown in FIG. 4, in the first embodiment, the base station eNB transmits system information including a parameter for all symbol RSRQ, so that the user apparatus UE measures all symbol RSRQ, and performs cell selection/cell reselection using the measurement value and the parameter for all symbol RSRQ. By the way, "measuring all symbol RSRQ, and using the measurement value and the parameter for all symbol RSRQ" does not mean that only all symbol RSRQ and corresponding parameters are used, but means that conventional parameters and the like may be also used as necessary. Same applies to other embodiments.

FIG. 5 shows an example of a SIB1 message in the first embodiment, and FIGS. 6A and 6B show description examples of fields of SIB1 in the first embodiment. The underlines in FIG. 5 and FIGS. 6A and 6B indicate that the underlined parts are new information. Underlines of other figures have the same meaning. The q-QualMinRev shown in FIG. 5 and FIGS. 6A and 6B is a value used as the minimum required quality ($Q_{qualmin}$) on all symbol RSRQ.

As described in FIG. 6A, the user apparatus UE that receives q-QualMinRev performs cell selection by performing measurement of all symbol RSRQ.

FIG. 7 shows an example of a SIB3 message in the first embodiment, and FIGS. 8A and 8B show description examples of fields of SIB3 in the first embodiment.

The q-QualMinRev shown in FIG. 7 and FIGS. 8A and 8B is a value used as the minimum required quality ($Q_{qualmin}$) on all symbol RSRQ in cell reselection in the cell. For example, the $Q_{qualmin}$ can be used for determining whether "all symbol RSRQ−$Q_{qualmin}$" falls below a predetermined threshold in order to start measurement of a neighbour cell for cell reselection. Same applies to other examples on SIB3.

As described in FIG. 8A, the user apparatus UE that receives q-QualMinRev performs cell reselection by performing measurement of all symbol RSRQ.

FIG. 9 shows an example of a SIB5 message in the first embodiment, and FIGS. 10A and 10B show description examples of fields of SIB5 in the first embodiment.

SIB5 includes q-QualMinRev, that is used for cell reselection, indicating the minimum required quality ($Q_{qualmin}$) of a neighbour cell where the user apparatus UE can reside. The value can be used, for example, for determining whether the user apparatus UE can reside in a selected neighbour cell (including determination similar to that in cell selection).

As described in FIG. 10A, the user apparatus UE that receives q-QualMinRev performs cell reselection by performing measurement of all symbol RSRQ.

Second Embodiment

Next, a second embodiment is described. In the second embodiment, the user apparatus UE measures RSRQ in a band (bandwidth) wider than 6 resource blocks and all symbols to perform cell selection/cell reselection. For the sake of convenience, RSRQ of wideband and all symbols is called wideband all symbol RSRQ. The wideband all symbol RSRQ is a kind of "all symbol RSRQ".

In the following, three examples (example 2-1, example 2-2, and example 2-3) for performing cell selection/cell reselection using the wideband all symbol RSRQ are described.

EXAMPLE 2-1

Figure 11:
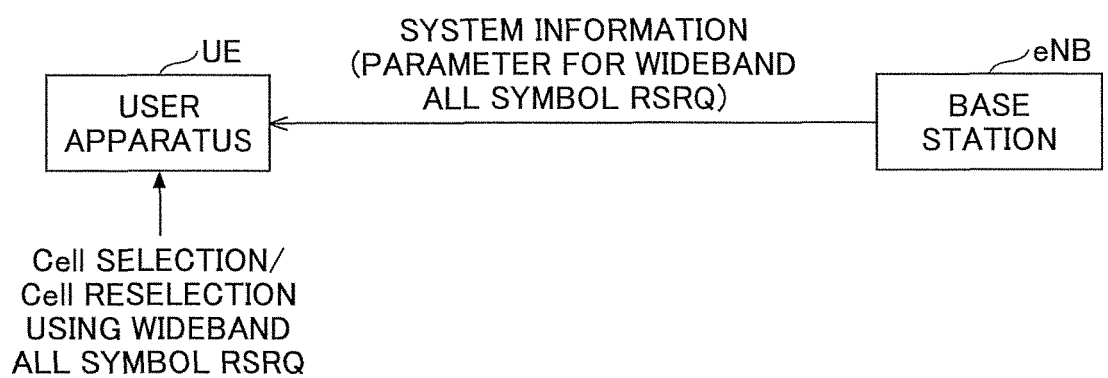
FIG. 11 is a diagram for explaining outline of an example 1 (example 2-1) in a second embodiment of the present invention.

In the example 2-1, as shown in FIG. 11, the base station eNB notifies the user apparatus UE of system information including a parameter for wideband all symbol RSRQ, so that the user apparatus UE measures wideband all symbol RSRQ to perform cell selection/cell reselection using the measured value and the parameter for wideband all symbol RSRQ.

FIG. 12 shows an example of a SIB1 message in the example 2-1, and FIGS. 13A and 13B show description examples of fields of SIB1 in the example 2-1. The q-QualMinComb shown in FIG. 12 and FIGS. 13A and 13B is a value used as the minimum required quality ($Q_{qualmin}$) on wideband all symbol RSRQ in cell selection.

As shown in FIG. 13A, the user apparatus UE that receives q-QualMinComb by SIB1 performs measurement of wideband all symbol RSRQ to perform cell selection.

FIG. 14 shows an example of a SIB3 message in the example 2-1, and FIGS. 15A and 15B show description examples of fields of SIB3 in the example 2-1.

The q-QualMinComb shown in FIG. 14 and FIGS. 15A and 15B is a value used as the minimum required quality ($Q_{qualmin}$) on wideband all symbol RSRQ in cell reselection in the cell. A use example of $Q_{qualmin}$ is as described before. As shown in FIG. 15A, the user apparatus UE that receives q-QualMinComb performs measurement of wideband all symbol RSRQ to perform cell selection.

FIG. 16 shows an example of a SIB5 message in the example 2-1, and FIGS. 17A and 17B show description examples of fields of SIB5 in the first embodiment.

SIB5 includes q-QualMinComb, that is used for cell reselection, indicating the minimum required quality ($Q_{qualmin}$) of a neighbour cell where the user apparatus UE can reside. The value can be used, for example, for determining whether the user apparatus UE can reside in a selected neighbour cell. As described in FIG. 17A, the user apparatus UE that receives q-QualMinComb performs measurement of wideband all symbol RSRQ to perform cell reselection.

EXAMPLE 2-2

Figure 18:
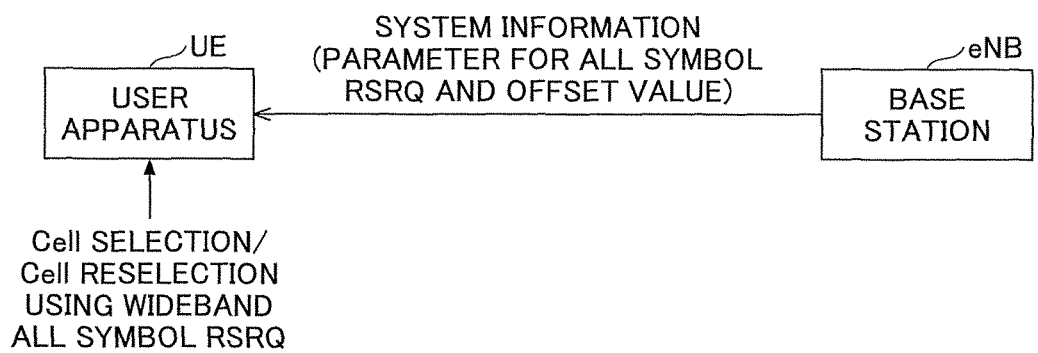
FIG. 18 is a diagram for explaining outline of an example 2 (example 2-2) in the second embodiment of the present invention.

The example 2-2 is described with reference to FIG. 18. In the example 2-2, the base station eNB transmits, to the user apparatus UE, a parameter (q-QualMinRev) for all symbol RSRQ described in the first embodiment, and, in addition to that, system information (SIB1, SIB3, SIB5 and the like) including an offset value for the parameter. The user apparatus UE performs cell selection/cell reselection by using "q-QualMinRev+offset value" as the minimum required quality $Q_{qualmin}$) when performing wideband all symbol RSRQ measurement. The offset value is +3 dB, for example.

EXAMPLE 2-3

Figure 19:
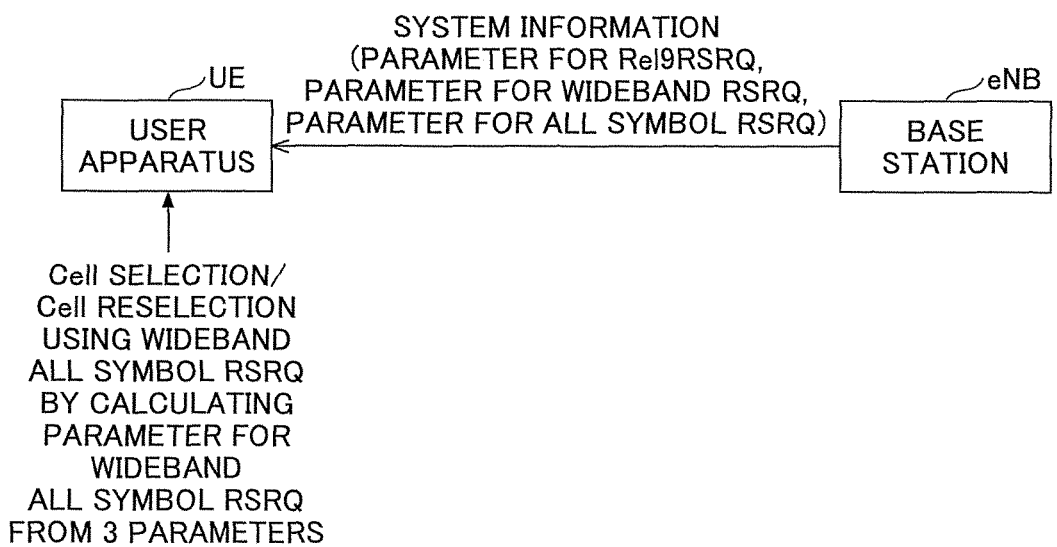
FIG. 19 is a diagram for explaining outline of an example 3 (example 2-3) in the second embodiment of the present invention.

The example 2-3 is described with reference to FIG. 19. In the example 2-3, the base station eNB transmits, to the user apparatus UE, system information (SIB1, SIB3, SIB5 and the like) including a parameter (q-QualMin) for Rel9RSRQ, a parameter (q-QualminWB) for wideband RSRQ, and a parameter (q-QualminRev) for all symbol RSRQ.

The user apparatus UE in the example 2-3 supports wideband all symbol RSRQ measurement, and when receiving the system information including the three parameters, the user apparatus UE determines to perform wideband all symbol RSRQ measurement in cell selection/cell reselection.

The user apparatus UE calculates a parameter for wideband all symbol RSRQ by using the following equation, for example.

$$Q_{qualmin}=\text{"}q\text{-QualminRev"}-(\text{"}q\text{-QualMin"}-\text{"}q\text{-QualminWB"})$$

As indicated in the above equation, a value obtained by subtracting "a value obtained by subtracting the parameter value for wideband RSRQ from the parameter value for Rel9RSRQ" from the parameter value for all symbol RSRQ is used as $Q_{qualmin}$ for wideband all symbol RSRQ. The user apparatus UE performs cell selection/cell reselection by using the $Q_{quaimin}$ that is calculated in this way.

Third Embodiment

Next, the third embodiment of the present invention is described. In an RRC connected state of LTE, measurement control is performed for performing handover control and the like associated with mobility. In the measurement control, the user apparatus UE measures RSRP and/or RSRQ of a serving cell and a neighbour cell, and when a specific condition (event) is satisfied, the user apparatus UE can report to the base station eNB.

In the third embodiment, in measurement in an RRC connected state, the user apparatus UE performs measurement of all symbol RSRQ (or wideband all symbol RSRQ), and transmits a measurement report to the base station eNB.

Outline of measurement control in an RRC connected state is described with reference to FIG. 20 (refer to non-patent document 2 for details, for example).

Measurement configuration information (measurement configuration) is transmitted from the base station eNB to the user apparatus UE by an RRC message. The measurement configuration information includes a measurement object, reporting configuration information (Reporting configuration), and a measurement ID (Measurement identity).

The measurement object includes objects to be measured such as a frequency (EARFCN) of a measurement target, a measurement bandwidth and the like. The reporting configuration information includes a trigger for reporting (event based, periodic, and the like), measurement/reporting amount (RSRP, RSRQ) and the like. The measurement ID is an ID for associating the measurement object with the reporting configuration information. It is possible to associate one measurement object (example: one frequency) with a plurality of pieces of reporting configuration information (example: in a case where different events are configured), and to identify each of them by a measurement ID.

As events that become triggers for measurement reporting, there are, for example, event A1, event A2, event A3, even A4, event A5, event A6 and the like as events of Intra EUTRA, and event B1, event B2 and the like as events of Inter RAT. Content of events is described in non-patent docuument 2, for example.

As an example, when the user apparatus UE performs handover (switching a serving cell), the event A3 is used, for example. The event A3 is an event in which reporting (measurement reporting) is performed when a value of RSRP and/or RSRQ of a neighbour cell becomes better than a value of the serving cell by an offset. A frequency of the neighbour cell to be measured and the offset and the like are designated in the measurement object. Also, the measurement report includes, for example, a measurement ID, a cell ID of a neighbour cell, and a measurement result of the neighbour cell, and the like. The base station that receives the measurement report manages the neighbour cell as a handover target cell.

Figure 20:
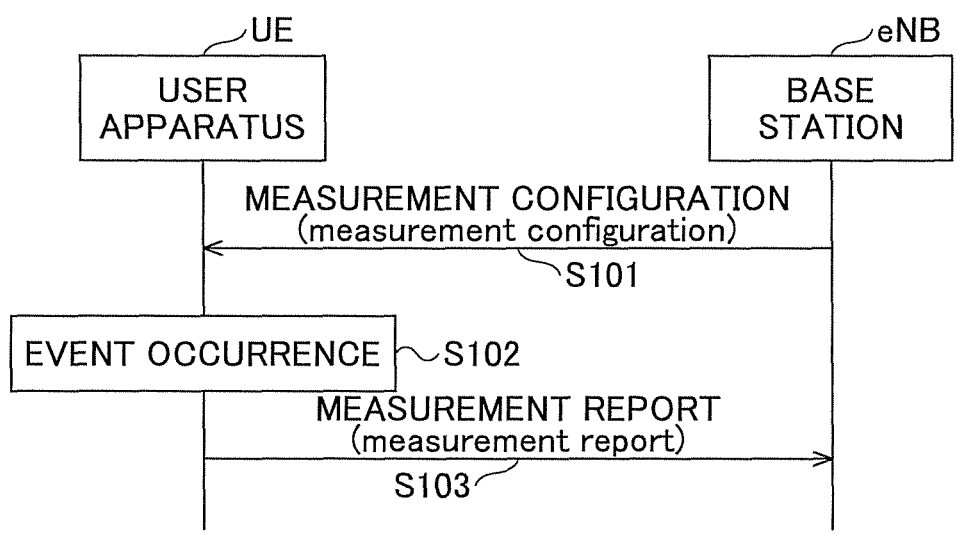
FIG. 20 is a sequence diagram for explaining outline of measurement in an RRC connected state in a third embodiment of the present invention.

In the example of FIG. 20, in step 102, an event like the above-mentioned one occurs (a condition of the event is satisfied), so that the user apparatus UE transmits a measurement report to the base station eNB in step 103.

In the third embodiment, by the above-mentioned measurement configuration information (measurement configuration), the user apparatus UE is instructed to measure all symbol RSRQ (or wideband all symbol RSRQ).

Figure 21:
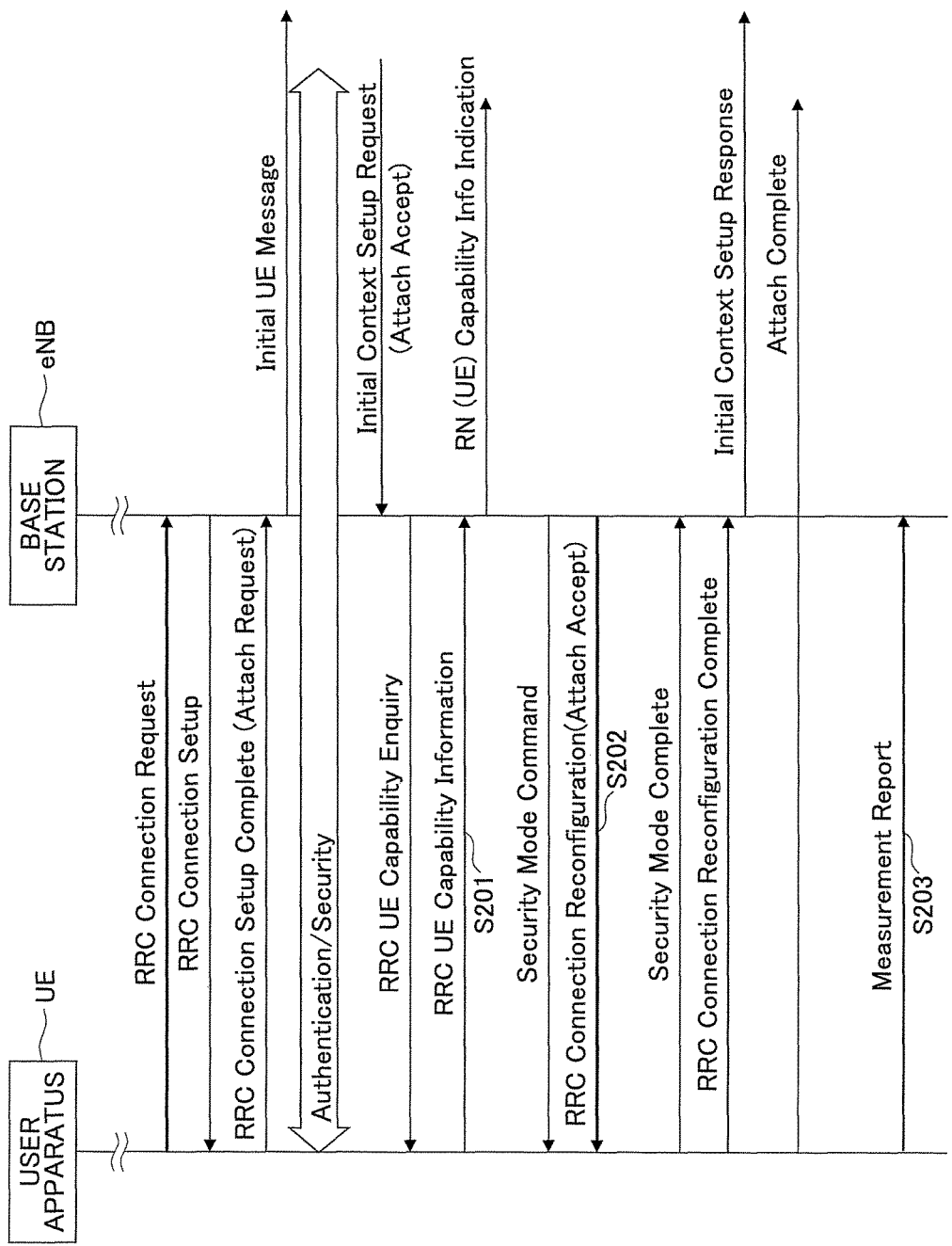
FIG. 21 is more detailed sequence diagram on measurement in an RRC connected state.

FIG. 21 shows a concrete sequence example in the third embodiment. This sequence is a sequence of RRC connection processing performed when originating a call/receiving a call in the user apparatus UE. This sequence itself exists conventionally. However, in FIG. 21, sequences where step number is shown include new information specific to the present embodiment.

In the example shown in FIG. 21, the user apparatus UE reports capability information (RRC UE Capability Information) to the base station eNB in response to receiving a capability information notification request (RRC UE Capability Enquiry) from the base station eNB (step 201). At this time, the user apparatus UE includes, in the capability information, information indicating that the user apparatus UE supports measurement of all symbol RSRQ (or wideband all symbol RSRQ).

FIGS. 22A and 22B show an example of capability information (UE-EUTRA-Capability information element) in the present embodiment. As shown in FIG. 22B, measRSRQ-Allsymbol in FIG. 22A indicates whether the user apparatus UE can perform all symbol RSRQ measurement. For example, when a predetermined value is set in measRSRQ-Allsymbol, it is determined that the user apparatus UE can perform all symbol RSRQ measurement. By the way, in the example shown in FIGS. 22A and 22B, although information indicating whether the user apparatus UE can perform all symbol RSRQ measurement is included, information indicating whether the user apparatus UE can perform wideband all symbol RSRQ measurement may be included.

The capability information in step 201 of FIG. 21 includes information indicating whether the user apparatus UE can perform all symbol RSRQ measurement.

The base station eNB that receives the capability information in step 201 of FIG. 21 determines that the user apparatus UE can perform all symbol RSRQ measurement based on the capability information, so that the base station eNB transmits, to the user apparatus UE, measurement configuration information (measurement object) including information instructing to measure all symbol RSRQ for a measurement target frequency in step 202 (RRC Connection Reconfiguration).

FIG. 23 shows an example of the measurement object (MeasObjectEUTRA information element) transmitted in step 202. As described in FIG. 24A, when measRSRQ-Allsymbol in FIG. 23 is True, the user apparatus UE performs all symbol RSRQ measurement when performing RSRQ measurement. In step 202 of FIG. 21, it is assumed that measRSRQ-Allsymbol is set to be True. Further, the measurement configuration information may include a parameter (threshold and the like) corresponding to all symbol RSRQ measurement according to an instructed event and the like.

In step 202, the user apparatus UE that received measurement configuration information in which measRSRQ-Allsymbol is set as True performs, for example, all symbol RSRQ measurement in each of the own cell and neighbour cells, so that the user apparatus UE transmits a measurement report including an all symbol RSRQ measurement result to the base station eNB when a predetermined event such as event A3 is satisfied (or when a periodic timing arrives).

By the way, although all symbol RSRQ measurement has been mainly explained in the above-mentioned examples, the same processing procedure can be applied also to wideband all symbol RSRQ measurement.

(Apparatus configuration)
<User Apparatus UE>

Figure 25:
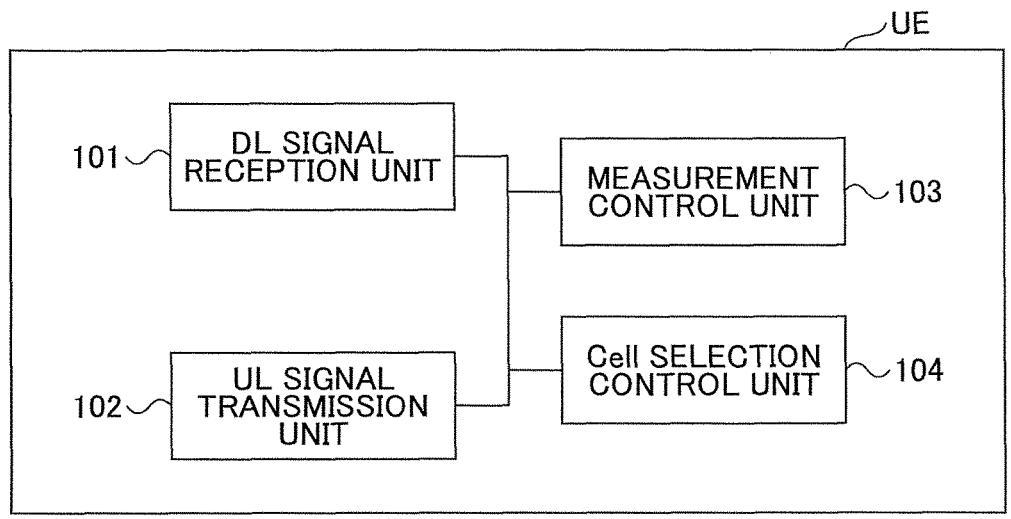
FIG. 25 is a block diagram of the user apparatus UE in an embodiment of the present invention.

FIG. 25 shows a functional block diagram of the user apparatus UE in an embodiment (first, second and third embodiments) of the present invention. As shown in FIG. 25, the user apparatus UE includes a DL signal reception unit 101, an UL signal transmission unit 102, a measurement control unit 103, and a cell selection control unit 104. By the way, FIG. 25 only shows functional units especially related to the present invention in the user apparatus UE, and the user apparatus UE also includes at least functions, not shown in the figure, for performing operation complying with LTE.

The DL signal reception unit 101 includes a function configured to receive various downlink signals from the base station eNB, and to obtain upper layer information from a received physical layer signal. The UL signal transmission unit 102 includes a function configured to generate various physical layer signals from upper layer information to be transmitted from the user apparatus UE, and to transmit it to the base station eNB.

The measurement control unit 103 includes an all symbol RSRQ measurement function and a wideband all symbol RSRQ measurement function in addition to a measurement function of the existing Rel9RSRQ and a measurement function of wideband RSRQ. For example, in cell selection/cell reselection, the measurement control unit 103 can perform RSRQ measurement by selecting any of Rel9RSRQ, wideband RSRQ, all symbol RSRQ, and wideband all symbol RSRQ according to a parameter included in system information (SIB1, SIB3, SIB5 and the like) received from the base station eNB. For example, when the system information includes only one of q-QualMin, q-QualMinWB, q-QualMinRev, and q-QualMinComb as a value used as $Q_{qualmin}$, the measurement control unit 103 performs RSRQ measurement corresponding to it. When the system information includes a plurality ones of q-QualMin, q-QualMinWB, q-QualMinRev, and q-QualMinComb, for example, the measurement control unit 103 performs RSRQ measurement by a predetermined method, and uses parameters corresponding to the method.

Also, as described in the example 2-3, when the system information includes q-QualMin, q-QualMinWB, and q-QualMinRev, the cell selection control unit 104 (or the measurement control unit 103) calculates a parameter for the wideband all symbol RSRQ (corresponding to q-QualMinComb) from q-QualMin, q-QualMinWB, and q-QualMinRev, and performs wideband all symbol RSRQ measurement to perform cell selection/cell reselection using a measured value and the calculated parameter.

Also, in an RRC connected state, the measurement control unit 103 is provided with a function for transmitting, to the base station eNB via the UL signal transmission unit 102, information indicating availability of measurement of Rel9RSRQ, wideband RSRQ, all symbol RSRQ, wideband all symbol RSRQ and the like, as capability information.

Also, in an RRC connected state, the measurement control unit 103 is provided with a function for performing measurement of any of Rel9RSRQ, wideband RSRQ, all symbol RSRQ, and wideband all symbol RSRQ to transmit a measurement result (measurement report) to the base station eNB via the UL signal transmission unit 102, based on measurement configuration information received from the base station eNB.

The cell selection control unit 104 performs control related to cell selection/cell reselection in an RRC idle state. For example, the cell selection control unit 104 performs cell selection/cell reselection by using a parameter (example:

q-QualMinRev) received from the base station eNB or "parameter+offset value", and a measurement result (example: all symbol RSRQ measurement result) corresponding to the parameter and the like performed by the measurement control unit 103.

Also, as described before, the cell selection control unit 104 includes a parameter calculation function described in the example 2-3, and includes a function for performing cell selection/cell reselection using the calculated parameter (corresponding to q-QualMinComb) and a measurement result (wideband all symbol RSRQ) measured by the measurement control unit 103.

<Base Station eNB>

Figure 26:
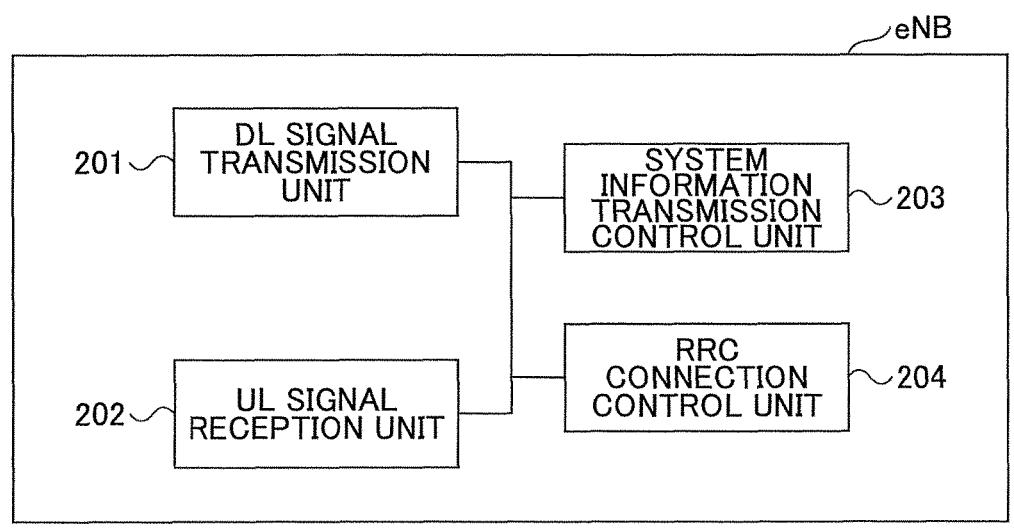
FIG. 26 is a block diagram of the base station eNB in an embodiment of the present invention.

FIG. 26 shows a functional block diagram of the base station eNB in an embodiment (first, second and third embodiments) of the present invention. As shown in FIG. 26, the base station eNB includes a DL signal transmission unit 201, an UL signal reception unit 202, a system information transmission control unit 203, and an RRC connection control unit 204. By the way, FIG. 26 only shows functional units especially related to the present invention in the base station eNB, and the base station eNB also includes at least functions, not shown in the figure, for performing operation complying with LTE.

The DL signal transmission unit 201 includes a function configured to generate various physical layer signals from upper layer information to be transmitted from the base station eNB, and to transmit the signals. The UL signal reception unit 202 includes a function configured to receive various uplink signals from the user apparatus UE, and to obtain upper layer information from a received physical layer signal.

The system information transmission control unit 203 performs transmission control of system information described in the first and the second embodiments. That is, the system information transmission control unit 203 includes a function for generating system information (SIB1, SIB3, SIB5 and the like) including a parameter described in the first and the second embodiments to transmit the system information to the user apparatus UE side via the DL signal transmission unit 201.

The RRC connection control unit 204 performs the RRC connection procedure indicated in FIG. 21 and the like of the third embodiment. That is, the RRC connection control unit 204 includes a function for receiving, from the user apparatus UE, via the UL signal reception unit 202, capability information including all symbol RSRQ measurement capability and the like, and, based on the capability information, transmitting measurement configuration information including information for instructing all symbol RSRQ measurement and the like to the user apparatus UE via the DL signal transmission unit 201.

By the way, configurations (functional segmentation) of apparatuses shown in FIG. 25 and FIG. 26 are merely examples. The implementation method (concrete arrangement of functional units, and the like) is not limited to a specific implementation method as long as the apparatuses can realize processing described in the present embodiments. For example, the user apparatus and the base station of the present embodiments can be configured as apparatuses including the following means.

That is, a user apparatus in the present embodiment is configured as a user apparatus in a mobile communication system including a base station and the user apparatus, including:

reception means that receives, from the base station, a parameter for all symbols that is used when performing cell selection processing or cell reselection processing based on all symbol signal reception quality that is signal reception quality based on measurement in all OFDM symbols; and cell selection control means that performs measurement of the all symbol signal reception quality, and performs cell selection processing or cell reselection processing by using a result of the measurement and the parameter for all symbols received by the reception means. According to this configuration, it becomes possible that a user apparatus obtains a parameter to be used for performing cell selection/cell reselection by measuring signal reception quality in all symbols to perform cell selection/cell reselection.

The reception means may be configured to receive, from the base station, an offset value in addition to the parameter for all symbols, and wherein the cell selection control means may be configured to measure wideband all symbol signal reception quality that is signal reception quality based on measurement in a band wider than a band of a predetermined number of resource blocks and all OFDM symbols, and perform cell selection processing or cell reselection processing by using a result of the measurement, and the parameter for all symbols and the offset value that are received by the reception means. According to this configuration, by transmitting an offset value in addition to the parameter for all symbols, it becomes possible to perform cell selection/cell reselection based on measurement of wideband all symbol signal reception quality.

A user apparatus of the present embodiment can be also configured as a user apparatus in a mobile communication system including a base station and the user apparatus, including:

reception means that receives, from the base station, a normal parameter that is used when performing cell selection processing or cell reselection processing based on normal signal reception quality that is signal reception quality based on measurement in a band of a predetermined number of resource blocks and predetermined OFDM symbols, a parameter for all symbols that is used when performing cell selection processing or cell reselection processing based on all symbol signal reception quality that is signal reception quality based on measurement in all OFDM symbols, and a parameter for wideband that is used when performing cell selection processing or cell reselection processing based on wideband signal reception quality that is signal reception quality based on measurement in a band wider than a band of a predetermined number of resource blocks; and cell selection control means that, based on the normal parameter, the parameter for all symbols, and the parameter for wideband, calculates a parameter for wideband all symbols that is used when performing cell selection processing or cell reselection processing based on wideband all symbol signal reception quality that is signal reception quality based on measurement in a band wider than a band of the predetermined number of resource blocks and all OFDM symbols, performs measurement of the wideband all symbol signal reception quality, and performs cell selection processing or cell reselection processing by using a result of the measurement and the calculated parameter for wideband all symbols. According to this configuration, it becomes possible to perform cell selection/cell reselection based on measurement of wideband all symbol signal reception quality without notification of a parameter for wideband all symbols from the base station.

A user apparatus of the present embodiment can be also configured as a user apparatus in a mobile communication system including a base station and the user apparatus, including:

transmission means that transmits, to the base station, capability information indicating that the user apparatus has a capability to measure all symbol signal reception quality that is signal reception quality based on measurement in all OFDM symbols; and measurement control means that receives, from the base station that receives the capability information, measurement configuration information instructing to measure the all symbol signal reception quality, measures the all symbol signal reception quality based on the measurement configuration information, and transmits a measurement report including a result of the measurement to the base station. According to this configuration, it becomes possible that a base station performs instruction of measurement of signal reception quality in all symbols to a user apparatus according to a capability of the user apparatus.

Also, according to the configuration of the present embodiment, it becomes possible to perform uniform cell selection/cell reselection in consideration of measurement difference to normal signal reception quality.

The signal reception quality is, for example, RSRQ, and the measurement in all OFDM symbols is to measure RSSI over all OFDM symbols for calculating RSRQ. According to this configuration, as to RSRQ defined in LTE, it becomes possible to perform cell selection/cell reselection based on measurement of all OFDM symbols, for example.

A base station of the present embodiment can be configured as a base station in a mobile communication system including the base station and a user apparatus, including:

transmission means that transmits a normal parameter that is used when performing cell selection processing or cell reselection processing based on normal signal reception quality that is signal reception quality based on measurement in a band of a predetermined number of resource blocks and predetermined OFDM symbols, a parameter for all symbols that is used when performing cell selection processing or cell reselection processing based on all symbol signal reception quality that is signal reception quality based on measurement in all OFDM symbols, and a parameter for wideband that is used when performing cell selection processing or cell reselection processing based on wideband signal reception quality that is signal reception quality based on measurement in a band wider than a band of a predetermined number of resource blocks. According to this configuration, it becomes possible to perform cell selection/cell reselection based on measurement of wideband all symbol signal reception quality without notification of a parameter for wideband all symbols from the base station.

A base station of the present embodiment can be also configured as a base station in a mobile communication system including the base station and a user apparatus, including:

reception means that receives, from the user apparatus, capability information indicating that the user apparatus has a capability to measure all symbol signal reception quality that is signal reception quality based on measurement in all OFDM symbols; and setting means that transmits, to the user apparatus, measurement configuration information instructing to measure the all symbol signal reception quality for which the capability information indicates that the user apparatus has measurement capability. According to this configuration, it becomes possible that a base station performs instruction of measurement of signal reception quality in all symbols to a user apparatus according to a capability of the user apparatus.

The signal reception quality is, for example, RSRQ, and the measurement in the all OFDM symbols is to measure RSSI over all OFDM symbols for calculating RSRQ. According to this configuration, as to RSRQ defined in LTE, it becomes possible to perform cell selection/cell reselection based on measurement of all OFDM symbols, for example.

Each apparatus (the user apparatus/the base station) described in the present embodiments may be configured such that, in the apparatus that includes a CPU and a memory, a program is executed by the CPU (processor), or may be configured by hardware such as hardware circuits including logics of processing described in the present embodiments, or may be configured by coexistence of a program and hardware.

In the above, each embodiment of the present invention has been explained. However, the disclosed invention is not limited to the embodiment. Those skilled in the art will conceive of various modified examples, corrected examples, alternative examples, substituted examples, and the like. While specific numerical value examples are used to facilitate understanding of the present invention, such numerical values are merely examples, and any appropriate value may be used unless specified otherwise. Classification into each item in the description is not essential in the present invention, and features described in two or more items may be combined and used as necessary. Subject matter described in an item may be applied to subject matter described in another item (provided that they do not contradict).

It is not always true that the boundaries of the functional units or the processing units in the functional block diagram correspond to boundaries of physical components. The operations by the plural functional units may be physically performed by a single component. Alternatively, the operations by the single functional unit may be physically performed by plural components.

For convenience of explanation, the user apparatus and the base station have been explained by using functional block diagrams. However, each apparatus may be implemented in hardware, software, or a combination thereof.

The software executed by a processor provided in the user apparatus and the software executed by a processor provided in the base station may be stored in any proper storage medium such as a Random Access Memory (RAM), a flash memory, a Read Only Memory (ROM), an EPROM, an EEPROM, a register, a hard disk (HDD), a removable disk, a CD-ROM, a database, a server and the like.

The present invention is not limited to the above-mentioned embodiment and is intended to include various variations, modifications, alterations, substitutions and so on without departing from the spirit of the present invention.

The present international patent application claims priority based on Japanese patent application No. 2014-098135, filed in the JPO on May 9, 2014, and the entire contents of the Japanese patent application No. 2014-098135 are incorporated herein by reference.

DESCRIPTION OF REFERENCE SIGNS eNB base station
UE user apparatus
101 DL signal reception unit
102 UL signal transmission unit
103 measurement control unit 104 cell selection control unit
201 DL signal transmission unit
202 UL signal reception unit
203 system information transmission control unit
204 RRC connection control unit

The invention claimed is:

1. A user apparatus in a mobile communication system including a base station and the user apparatus, comprising:
a receiver that receives, from the base station, a System Information Block Type 1 (SIB1) message that includes:
a parameter for all symbols that is used when performing cell selection processing or cell reselection processing based on an all symbol signal reception quality, wherein the all symbol signal reception quality is based on a first measurement on all Orthogonal Frequency Division Multiplexing (OFDM) symbols,
and an offset value; and
a processor coupled to the receiver configured to:
perform a second measurement of a wideband all symbol signal reception quality, wherein the wideband all symbol signal reception quality is measured in a band wider than a band of a predetermined number of resource blocks and all OFDM symbols, and
perform cell selection processing or cell reselection processing by using a result of the second measurement, the parameter for all symbols, and the offset value received by the receiver.

2. The user apparatus as claimed in claim 1, wherein the signal reception quality is Reference Signal Received Quality (RSRQ), the first measurement is to measure Received Signal Strength Indicator (RSSI) over all OFDM symbols for calculating RSRQ.

3. A user apparatus in a mobile communication system including a base station and the user apparatus, comprising:
a receiver that receives, from the base station, a System Information Block Type 1 (SIB1) message that includes:
a normal parameter that is used when performing cell selection processing or cell reselection processing based on a normal signal reception quality, wherein the normal signal reception quality is based on a first measurement in a band of a predetermined number of resource blocks and on predetermined Orthogonal Frequency Division Multiplexing (OFDM) symbols,
a parameter for all symbols that is used when performing cell selection processing or cell reselection processing based on an all symbol signal reception quality, wherein the all symbol signal reception quality is based on a second measurement on all OFDM symbols, and
a parameter for wideband that is used when performing cell selection processing or cell reselection processing based on a wideband signal reception quality, wherein the wideband signal reception quality is based on a third measurement in a band wider than a band of a predetermined number of resource blocks; and
a processor coupled to the receiver configured, based on the normal parameter, the parameter for all symbols, and the parameter for wideband, to:
calculate a parameter for wideband all symbols that is used when performing cell selection processing or cell reselection processing based on a wideband all symbol signal reception quality, wherein the wideband all symbol signal reception quality is based on a fourth measurement in a band wider than a band of the predetermined number of resource blocks and on all OFDM symbols,
perform the fourth measurement of the wideband all symbol signal reception quality, and
perform cell selection processing or cell reselection processing by using a result of the fourth measurement and the calculated parameter for wideband all symbols,
wherein the processor calculates the parameter for wideband all symbols by subtracting, from the parameter for all symbols, a value obtained by subtracting the parameter for wideband from the normal parameter.

4. The user apparatus as claimed in claim 3, wherein the signal reception quality is Reference Signal Received Quality (RSRQ), the second measurement on all OFDM symbols is to measure Received Signal Strength Indicator (RSSI) over all OFDM symbols for calculating RSRQ.

5. A base station in a mobile communication system including the base station and a user apparatus, comprising:
a transmitter that transmits a System Information Block Type 1 (SIB1) message that includes:
a normal parameter that is used when performing cell selection processing or cell reselection processing based on a normal signal reception quality, wherein the normal signal reception quality is based on a first measurement in a band of a predetermined number of resource blocks and predetermined Orthogonal Frequency Division Multiplexing (OFDM) symbols,
a parameter for all symbols that is used when performing cell selection processing or cell reselection processing based on an all symbol signal reception quality, wherein the all symbol signal reception quality is based on a second measurement on all OFDM symbols, and
a parameter for wideband that is used when performing cell selection processing or cell reselection processing based on a wideband signal reception quality, wherein the wideband signal reception quality is based on a third measurement in a band wider than a band of a predetermined number of resource blocks,
wherein, in the user apparatus, a parameter for wideband all symbols is calculated by subtracting, from the parameter for all symbols, a value obtained by subtracting the parameter for wideband from the normal parameter, and
wherein the parameter for wideband all symbols is used when performing cell selection processing or cell reselection processing based on a wideband all symbol signal reception quality, wherein the wideband all symbol signal reception quality is based on a fourth measurement in a band wider than a band of a predetermined number of resource blocks and all OFDM symbols.

6. The base station as claimed in claim 5, wherein the signal reception quality is Reference Signal Received Quality (RSRQ), the second measurement on the all OFDM symbols is to measure Received Signal Strength Indicator (RSSI) over all OFDM symbols for calculating RSRQ.

7. A cell selection control method executed by a user apparatus in a mobile communication system including a base station and the user apparatus, comprising:

receiving, from the base station, a System Information Block Type 1 (SIB1) message that includes:
- a parameter for all symbols that is used when performing cell selection processing or cell reselection processing based on an all symbol signal reception quality, wherein the all symbol signal reception quality is based on a first measurement on all Orthogonal Frequency Division Multiplexing (OFDM) symbols,
- and an offset value; and performing a second measurement of a wideband all symbol signal reception quality, wherein the wideband all symbol signal reception quality is based on a third measurement in a band wider than a band of a predetermined number of resource blocks and on all OFDM symbols, and performing cell selection processing or cell reselection processing by using a result of the second measurement, the parameter for all symbols, and the offset value received.

8. A parameter transmission method executed by a base station in a mobile communication system including the base station and a user apparatus, comprising:

transmitting a System Information Block Type 1 (SIB1) message that includes:
- a normal parameter that is used when performing cell selection processing or cell reselection processing based on a normal signal reception quality, wherein the normal signal reception quality is based on a first measurement in a band of a predetermined number of resource blocks and on predetermined Orthogonal Frequency Division Multiplexing (OFDM) symbols,
- a parameter for all symbols that is used when performing cell selection processing or cell reselection processing based on an all symbol signal reception quality, wherein the all symbol signal reception quality is based on a second measurement on all OFDM symbols, and
- a parameter for wideband that is used when performing cell selection processing or cell reselection processing based on a wideband signal reception quality, wherein the wideband signal reception quality is based on a third measurement in a band wider than a band of a predetermined number of resource blocks, wherein, in the user apparatus, a parameter for wideband all symbols is calculated by subtracting, from the parameter for all symbols, a value obtained by subtracting the parameter for wideband from the normal parameter, and wherein the parameter for wideband all symbols is used when performing cell selection processing or cell reselection processing based on a wideband all symbol signal reception quality, wherein the wideband all symbol signal reception quality is based on a fourth measurement in a band wider than a band of a predetermined number of resource blocks and on all OFDM symbols.

* * * * *